(12) United States Patent
Akkarakaran et al.

(10) Patent No.: US 11,206,645 B2
(45) Date of Patent: *Dec. 21, 2021

(54) SCHEDULING AND TRANSMISSION SCHEME FOR PERIODIC AND APERIODIC CONTROL INFORMATION

(71) Applicant: QUALCOMM Incorporated, San Diego, CA (US)

(72) Inventors: Sony Akkarakaran, Poway, CA (US); Tao Luo, San Diego, CA (US); Bilal Sadiq, Basking Ridge, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,382

(22) Filed: Mar. 9, 2020

(65) Prior Publication Data

US 2020/0214000 A1 Jul. 2, 2020

Related U.S. Application Data

(63) Continuation of application No. 15/951,691, filed on Apr. 12, 2018, now Pat. No. 10,624,070.

(Continued)

(51) Int. Cl.
*H04W 72/04* (2009.01)
*H04W 72/14* (2009.01)
(Continued)

(52) U.S. Cl.
CPC ....... *H04W 72/0413* (2013.01); *H04J 3/1694* (2013.01); *H04L 5/0053* (2013.01);
(Continued)

(58) Field of Classification Search
None
See application file for complete search history.

(56) References Cited

U.S. PATENT DOCUMENTS

2009/0268693 A1 10/2009 Lindh et al.
2015/0049740 A1 2/2015 Lee et al.
(Continued)

OTHER PUBLICATIONS

Ericsson: "On UCI on PUSCH" 3GPP Draft; R1-1706041, 3rd Generation Partnership Project (3GPP), Mobile Competence Centre; 650, Route Des Lucioles; F-06921 Sophia-Antipolis Cedex; France, vol. RAN WG1, No. Spokane, US; Apr. 3, 2017-Apr. 7, 2017, Apr. 2, 2017 (Apr. 2, 2017), XP051244149, 2 pages, Retrieved from the Internet: URL: http://www.3gpp.org/ftp/Meetings_3GPP_SYNC/RAN1/Docs/ [retrieved on Apr. 2, 2017].

(Continued)

*Primary Examiner* — Saba Tsegaye
(74) *Attorney, Agent, or Firm* — Loza & Loza, LLP

(57) ABSTRACT

Aspects of the present disclosure provide a scheduling and transmission scheme to manage multiple uplink control information (UCI) resource grants for periodic and aperiodic UCI for a particular user equipment (UE). Grant selection rules may be defined to enable the UE to select one or more of the UCI resource grants allocated within a particular period of time. In addition, the grant selection rules may further enable the UE to combine both periodic and aperiodic UCI within a particular UCI resource grant. The grant selection rules may further enable the UE to multiplex UCI over multiple UCI resource grants. Other aspects, embodiments, and features are also claimed and described.

68 Claims, 22 Drawing Sheets

Related U.S. Application Data

(60) Provisional application No. 62/485,862, filed on Apr. 14, 2017.

(51) Int. Cl.
*H04J 3/16* (2006.01)
*H04L 5/00* (2006.01)
*H04W 72/12* (2009.01)

(52) U.S. Cl.
CPC .......... *H04L 5/0082* (2013.01); *H04L 5/0094* (2013.01); *H04W 72/1268* (2013.01); *H04W 72/14* (2013.01); *H04L 5/001* (2013.01); *H04L 5/0023* (2013.01); *H04W 72/1284* (2013.01)

(56) References Cited

U.S. PATENT DOCUMENTS

| | | | |
|---|---|---|---|
| 2016/0014810 | A1 | 1/2016 | Tabet et al. |
| 2017/0245263 | A1 | 8/2017 | Li et al. |
| 2018/0302895 | A1 | 10/2018 | Akkarakaran et al. |
| 2018/0368177 | A1* | 12/2018 | Dudda .............. H04W 72/1268 |
| 2019/0045536 | A1 | 2/2019 | Gao et al. |
| 2019/0116489 | A1* | 4/2019 | Harada ............. H04W 72/0453 |
| 2019/0116611 | A1* | 4/2019 | Lee .................. H04W 72/1278 |

OTHER PUBLICATIONS

Guangdong Oppo Mobile Telecom: "Waveform Selection for Uplink Control Signal", 3GPP Draft; R1-1611705, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051175675, 5 pages, Retrieved from the Internet: URL: http://www.3gpp.org/ftp/Meetings_3GPP_SYNC/RAN1/Docs [retrieved on Nov. 13, 2016].

Huawei et al: "Long Duration UL Control Channel Design," 3GPP Draft; R1-1700017, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), XP051207559, 4 pages, Retrieved from the Internet: URL: http://www.3gpp.org/ftp/Meetings_3GPP_SYNC/RAN1/Docs [retrieved on Jan. 16, 2017].

International Search Report and Written Opinion—PCT/US2018/027457—ISA/EPO—dated Jun. 29, 2018.

NTT Docomo et al: "Designs for PUCCH in Long Duration," 3GPP Draft; R1-1702812, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-20179217, Feb. 12, 2017 (Feb. 12, 2017), XP051209957, 9 pages, Retrieved from the Internet: URL: http://www.3gpp.org/ftp/Meetings_3GPP_SYNC/RAN1/Docs/ [retrieved on Feb. 12, 2017].

Qualcomm Incorporated: "Resource Allocation for PUCCH", 3GPP Draft; R1-1705613 RESOURCE_ALLOCATION_FOR_PUCCH, 3rd Generation Partnership Project (3GPP), Mobile Competence Centre; 650 Route Des Lucioles; F-06921 Sophia-Antipolis Cedex; France, vol. RAN WG1, No. Spokane, US; Apr. 3, 2017-Apr. 7, 2017, Apr. 2, 2017 (Apr. 2, 2017), XP051243737, 5 pages, Retrieved from the Internet: URL: http://www.3gpp.org/ftp/Meetings_3GPP_SYNC/RAN1/Docs/ [retrieved on Apr. 2, 2017].

\* cited by examiner

DL-Centric Slot

UL-Centric Slot

SCHEDULING AND TRANSMISSION SCHEME FOR PERIODIC AND APERIODIC CONTROL INFORMATION

PRIORITY CLAIM

The present Application for patent is a Continuation of U.S. Pat. No. 10,624,070 issued on Apr. 14, 2020, the entire content of which is incorporated herein by reference as if fully set forth below in its entirety and for all applicable purposes. U.S. Pat. No. 10,624,070 claims priority to and the benefit of Provisional Patent Application No. 62/485,862 filed in the U.S. Patent and Trademark Office on Apr. 14, 2017, the entire content of which is incorporated herein by reference as if fully set forth below in its entirety and for all applicable purposes.

TECHNICAL FIELD

The technology discussed below relates generally to wireless communication systems, and more particularly, to scheduling and transmission of uplink control information (UCI).

INTRODUCTION

Wireless transmissions between a base station and one or more user equipment (UE) within a cell are generally scheduled in each subframe or slot. For example, the base station may assign resources (e.g., time-frequency resources) for downlink transmissions to one or more UEs and grant the use of resources for uplink transmissions from one or more UEs. The downlink assignments and uplink grants may be provided to the UEs via a physical downlink control channel (PDCCH) or via higher layer signaling, such as radio resource control (RRC) signaling.

Uplink grants may be specified for uplink user data traffic. In addition, uplink control information (UCI) resource grants may be specified for particular UCI. Examples of UCI include scheduling requests for uplink user data traffic, channel quality information (CQI), multiple-input-multiple-output (MIMO) parameters, such as rank and precoder index, and hybrid automatic repeat request (HARQ) feedback transmissions, such as an acknowledgment (ACK) or negative acknowledgment (NACK) of a downlink transmission. UCI may be transmitted via a physical uplink control channel (PUCCH) or via a physical uplink shared channel (PUSCH). In addition, a base station may allocate UCI resources to a UE either dynamically using dynamic signaling (e.g., as downlink control information (DCI) within the PDCCH) or semi-statically using higher layer signaling (e.g., RRC signaling). In legacy (e.g., 4G) wireless communication networks, such as the Long Term Evolution (LTE) wireless network, PUCCH resources are typically allocated semi-statically, while PUSCH resources are typically allocated dynamically.

However, in next generation (e.g., 5G) wireless networks, such as the New Radio (NR) wireless network, PUCCH resources may be allocated both semi-statically and dynamically. Semi-static PUCCH resource grants may carry, for example, periodic UCI, such as periodic scheduling requests, CQI, and HARQ feedback transmissions for periodic or semi-persistent downlink transmissions. Dynamic PUCCH or PUSCH grants may carry, for example, aperiodic UCI, such as HARQ feedback transmissions for regular downlink transmissions (e.g., not periodic or semi-persistent downlink transmissions), HARQ feedback transmissions for certain PDCCH information, and aperiodic CQI reports. Various mechanisms for managing both dynamic (aperiodic) and semi-static (periodic) UCI grants continue to be researched and developed.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to a scheduling and transmission scheme to manage multiple uplink control information (UCI) resource grants for periodic and aperiodic UCI for a particular UE. Grant selection rules may be defined to enable the UE to select one or more of the UCI resource grants allocated within a particular period of time. In addition, the grant selection rules may further enable the UE to combine both periodic and aperiodic UCI for transmission on the selected uplink resource. This may enable freeing some of the granted uplink resources for other uplink transmissions. The grant selection rules may further enable the UE to multiplex UCI over multiple UCI resource grants to provide a larger coding gain as a result of a larger block size.

In one aspect of the disclosure, a method of wireless communication in a wireless communication network is provided. The method includes receiving, at a scheduled entity, a first uplink control information (UCI) resource grant allocating a first set of resource elements for use by the scheduled entity to transmit first uplink control information to a scheduling entity, receiving, at the scheduled entity, a second UCI resource grant allocating a second set of resource elements for use by the scheduled entity to transmit second uplink control information to the scheduling entity, and when a time difference between the first set of resource elements and the second set of resource elements is less than a threshold indicating that the first UCI resource grant and the second UCI resource grant occur within a same time period, selecting at least one of the first UCI resource grant or the second UCI resource grant based on one or more grant selection rules, where the threshold corresponds to the time period.

Another aspect of the disclosure provides a scheduled entity in wireless communication with a scheduling entity in a wireless communication network. The scheduled entity includes a processor, a transceiver communicatively coupled to the processor, and a memory communicatively coupled to the processor. The processor is configured to receive a first uplink control information (UCI) resource grant allocating a first set of resource elements for use by the scheduled entity to transmit first uplink control information to the scheduling entity via the transceiver, receive a second UCI resource grant allocating a second set of resource elements for use by the scheduled entity to transmit second uplink control information to the scheduling entity via the transceiver, and when a time difference between the first set of resource elements and the second set of resource elements is less than a threshold indicating that the first UCI resource grant and the second UCI resource grant occur within a same time period, select at least one of the first UCI resource grant or the second UCI resource grant based on one or more grant selection rules, where the threshold corresponds to the time period.

Another aspect of the disclosure provides a scheduled entity in wireless communication with a scheduling entity in a wireless communication network. The scheduled entity includes means for receiving a first uplink control information (UCI) resource grant allocating a first set of resource elements for use by the scheduled entity to transmit first uplink control information to a scheduling entity, means for receiving a second UCI resource grant allocating a second set of resource elements for use by the scheduled entity to transmit second uplink control information to the scheduling entity, and when a time difference between the first set of resource elements and the second set of resource elements is less than a threshold indicating that the first UCI resource grant and the second UCI resource grant occur within a same time period, means for selecting at least one of the first UCI resource grant or the second UCI resource grant based on one or more grant selection rules, where the threshold corresponds to the time period.

Another aspect of the disclosure provides a non-transitory computer-readable medium storing computer executable code. The non-transitory computer-readable medium includes code for causing a computer to receive, at a scheduled entity, a first uplink control information (UCI) resource grant allocating a first set of resource elements for use by the scheduled entity to transmit first uplink control information to a scheduling entity, receive, at the scheduled entity, a second UCI resource grant allocating a second set of resource elements for use by the scheduled entity to transmit second uplink control information to the scheduling entity, and when a time difference between the first set of resource elements and the second set of resource elements is less than a threshold indicating that the first UCI resource grant and the second UCI resource grant occur within a same time period, select at least one of the first UCI resource grant or the second UCI resource grant based on one or more grant selection rules, where the threshold corresponds to the time period.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
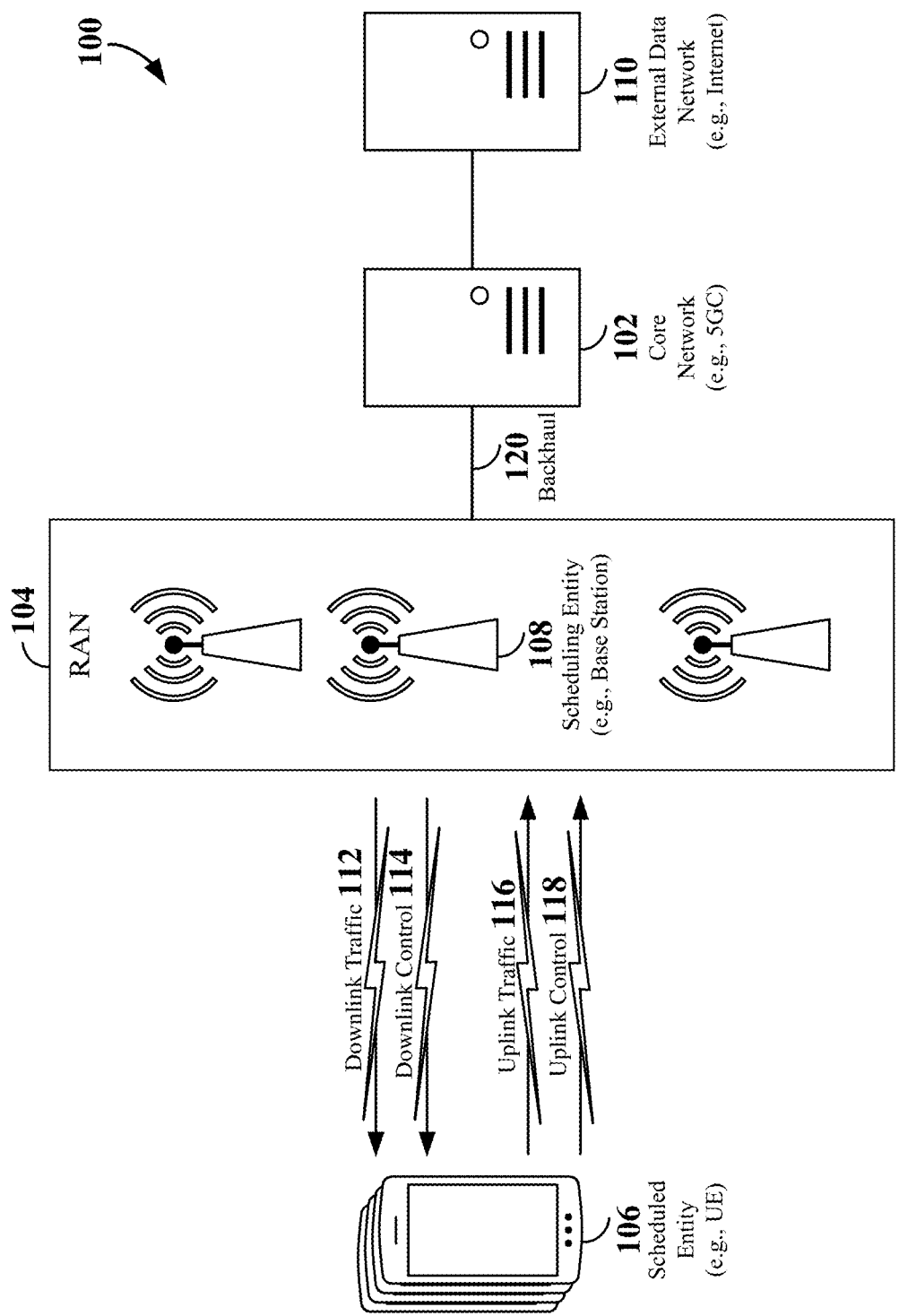
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
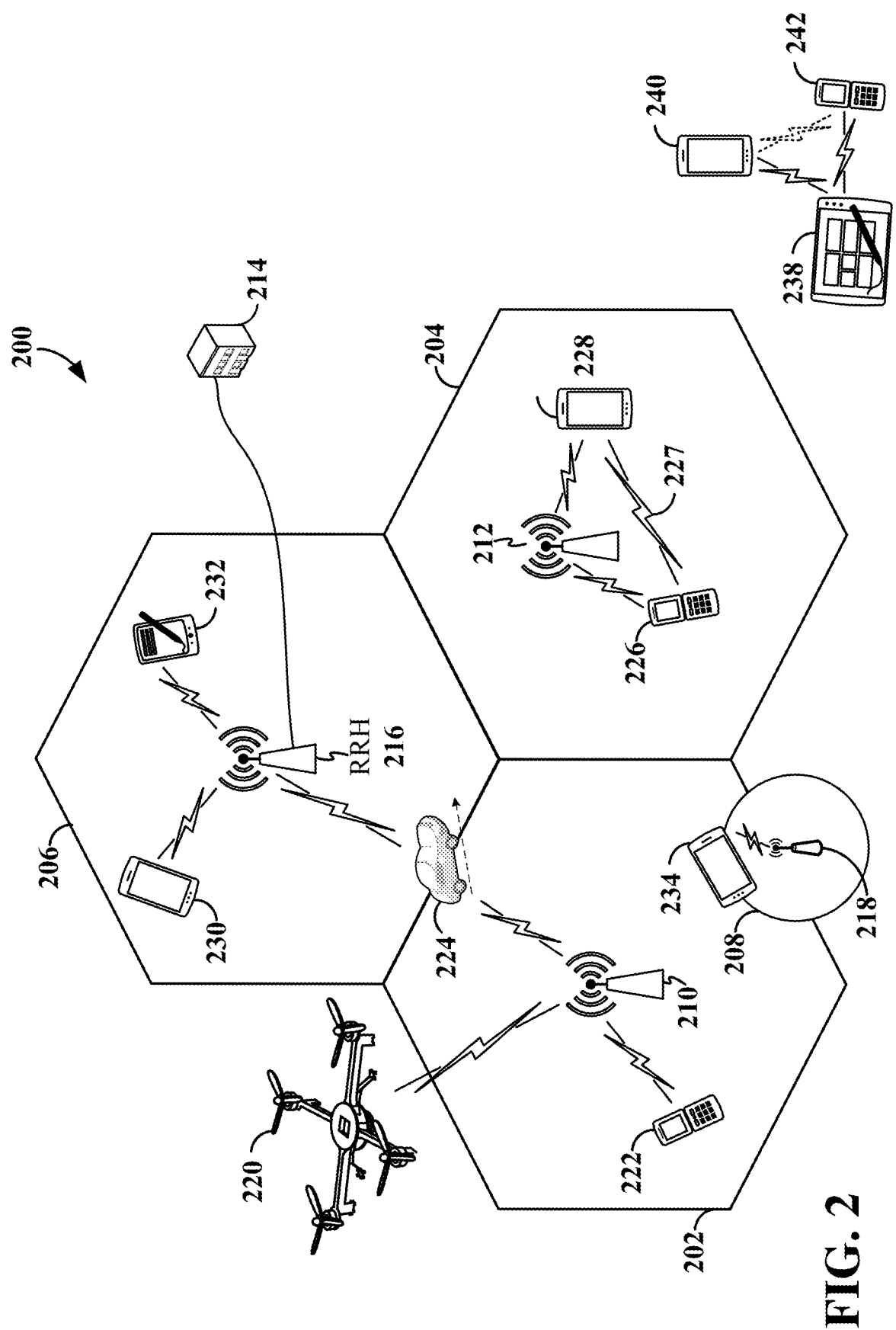
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216;

and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
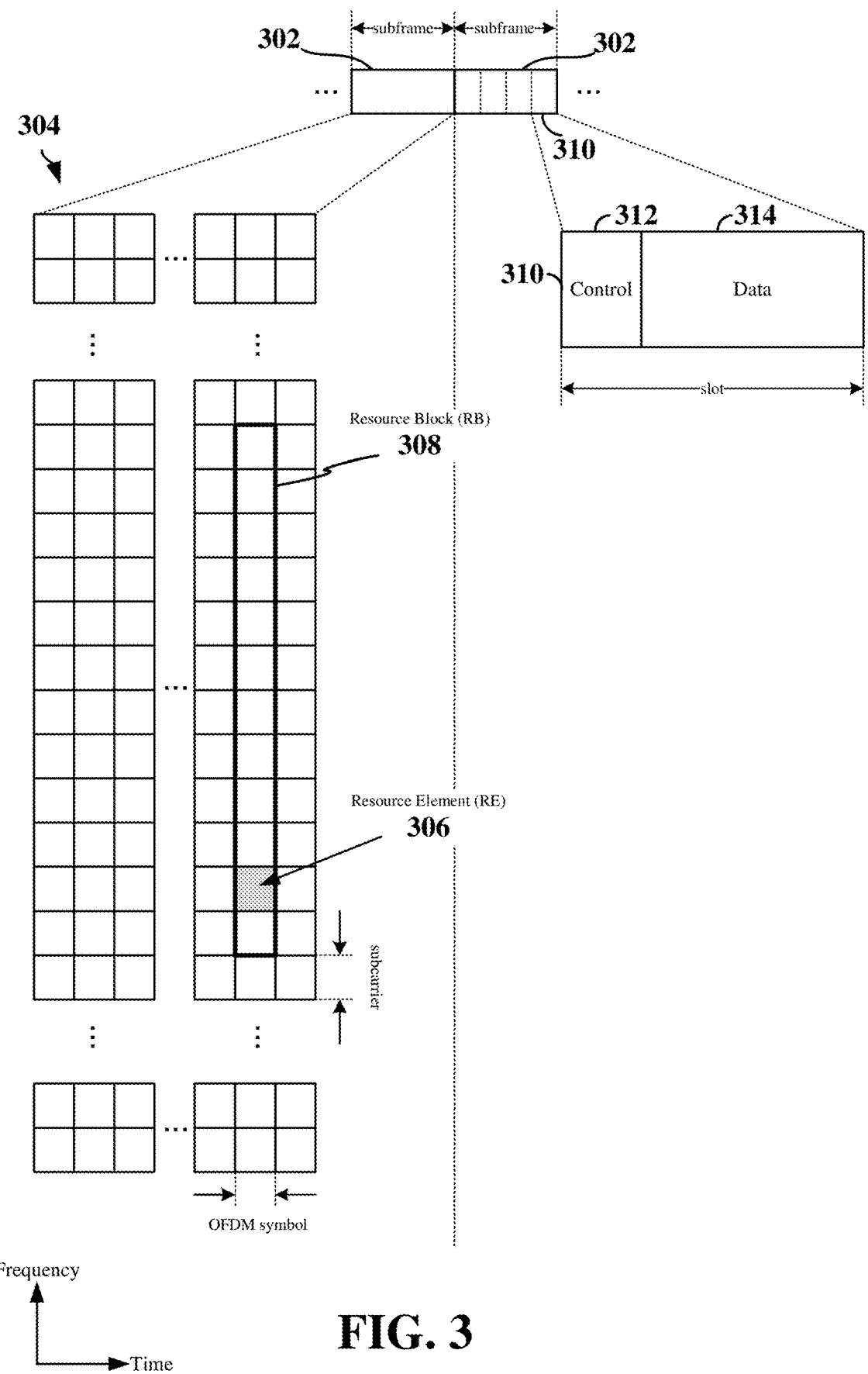
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG) or sub-band. A set of sub-bands may span the entire bandwidth. Scheduling of UEs (scheduled entities) for downlink or uplink transmissions typically involves scheduling one or more resource elements 306 within one or more sub-bands. Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks or resource block groups (e.g., groups of sub-carriers and OFDM symbols) may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
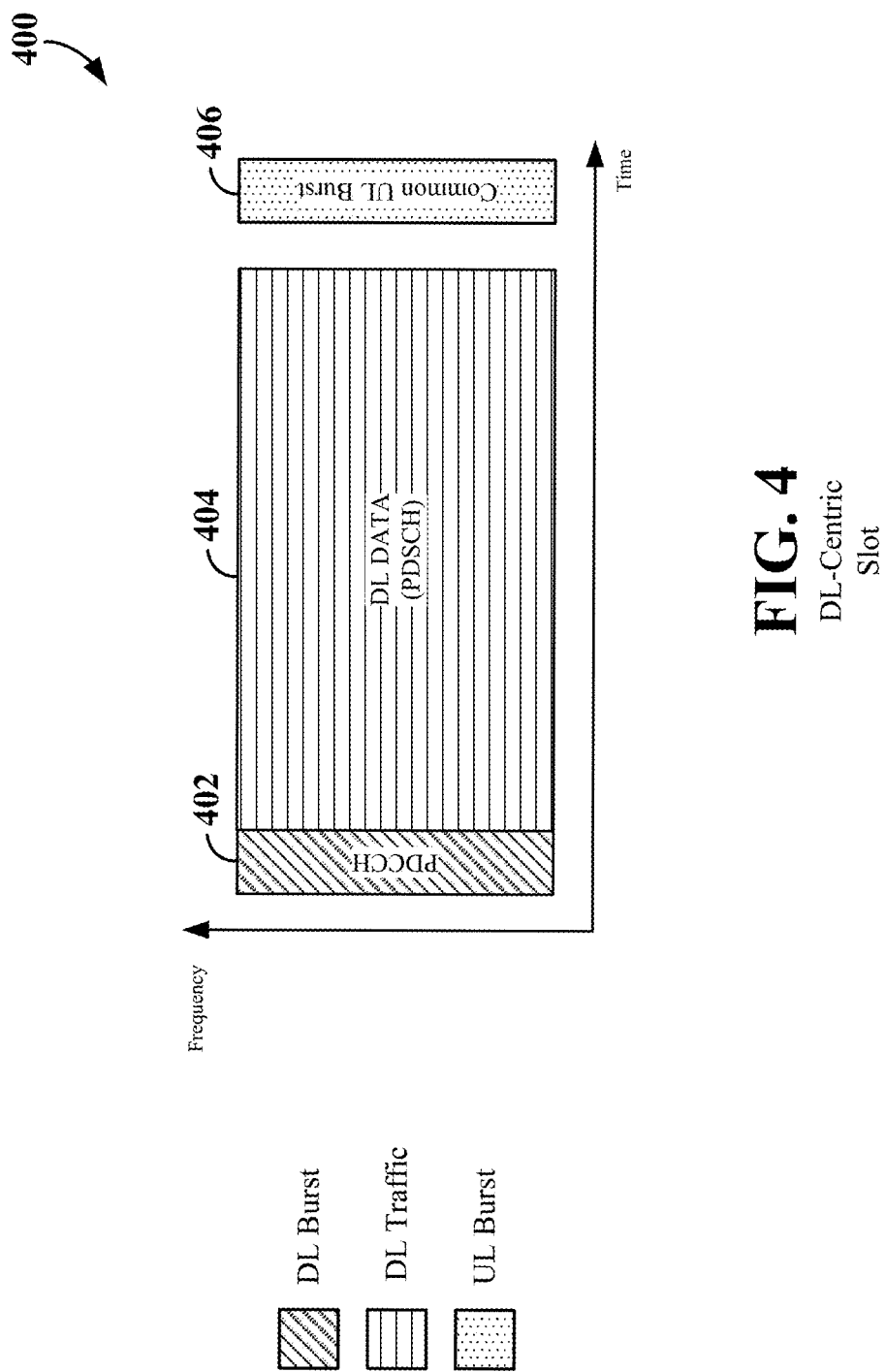
FIG. 4 is a diagram illustrating an example of a downlink (DL)-centric slot.
Figure 5:
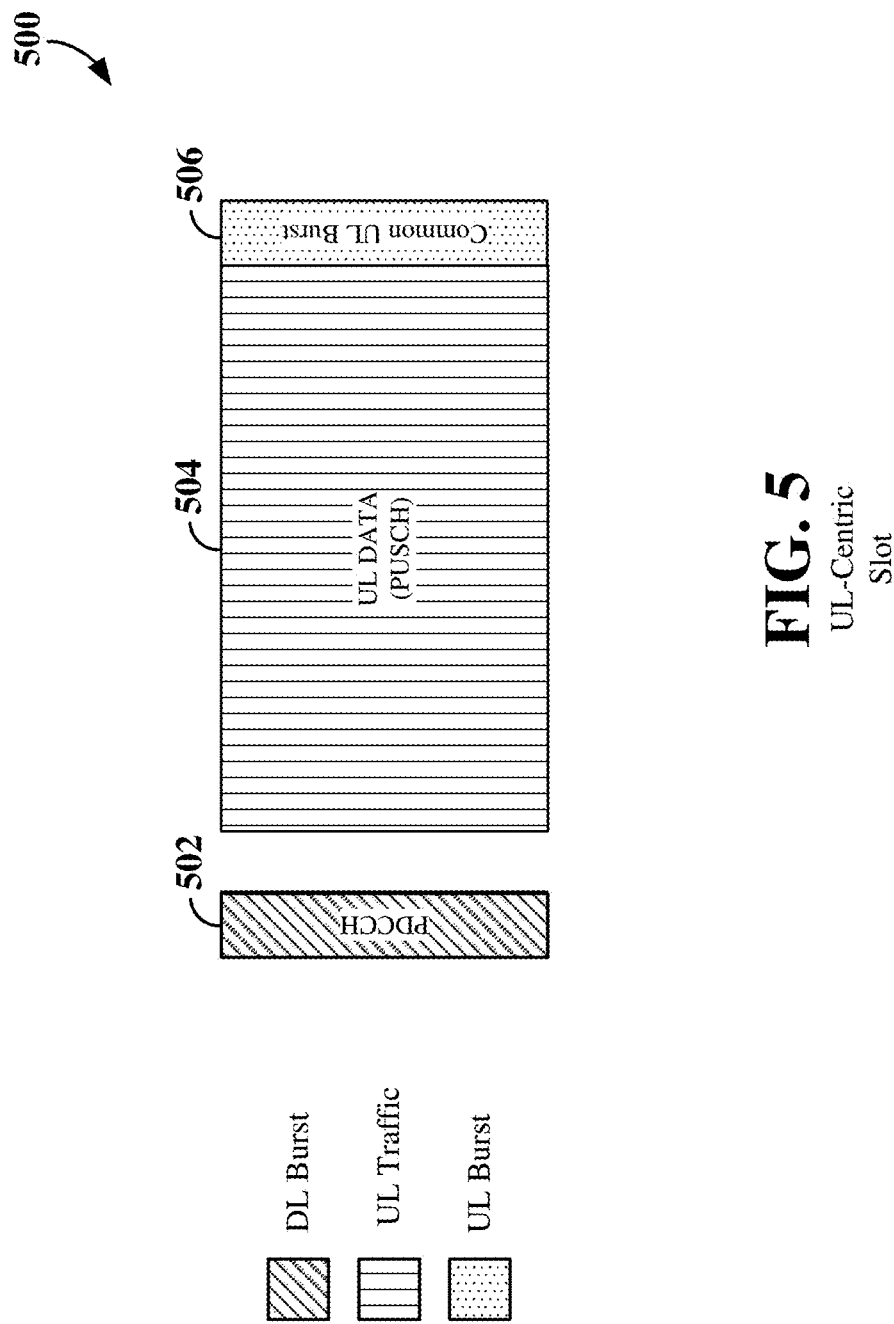
FIG. 5 is a diagram illustrating an example of an uplink (UL)-centric slot.

According to an aspect of the disclosure, one or more slots may be structured as self-contained slots. For example, FIGS. 4 and 5 illustrate two example structures of self-contained slots 400 and 500. The self-contained slots 400 and/or 500 may be used, in some examples, in place of the slot 310 described above and illustrated in FIG. 3.

FIG. 4 is a diagram illustrating an example of a downlink (DL)-centric slot 400 according to some aspects of the disclosure. The nomenclature DL-centric generally refers to a structure wherein more resources are allocated for transmissions in the DL direction (e.g., transmissions from the scheduling entity 108 to the scheduled entity 106). In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 406.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH), as indicated in FIG. 4. The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 108 (e.g., eNB) to the scheduled entity 106 (e.g., UE). In some configurations, the DL traffic region 404 may include a physical DL shared channel (PDSCH).

The UL burst 406 may include any suitable UL information in one or more channels. In some examples, the UL burst 406 may include feedback information corresponding to various other portions of the DL-centric slot. For example, the UL burst 406 may include feedback information corresponding to the DL burst 402 and/or DL traffic region 404. Non-limiting examples of feedback information may include an ACK signal, a NACK signal, a HARQ indicator, and/or various other suitable types of information. The UL burst 406 may include additional or alternative information, such as information pertaining to random access channel (RACH) procedures, scheduling requests (SRs) (e.g., within a PUCCH), and various other suitable types of information.

Here, a slot such as the DL-centric slot 400 may be referred to as a self-contained slot when all of the data carried in the DL traffic region 404 is scheduled in the DL burst 402 of the same slot; and further, when all of the data carried in the DL traffic region 404 is acknowledged (or at least has an opportunity to be acknowledged) in the UL burst 406 of the same slot. In this way, each self-contained slot may be considered a self-contained entity, not necessarily requiring any other slot to complete a scheduling-transmission-acknowledgment cycle for any given packet.

As illustrated in FIG. 4, the end of the DL traffic region 404 may be separated in time from the beginning of the UL burst 406. This time separation may sometimes be referred to as a gap, a guard period, a guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. The nomenclature UL-centric generally refers to a structure wherein more resources are allocated for transmissions in the UL direction (e.g., transmissions from the scheduled entity 106 to the scheduling entity 108). In the example shown in FIG. 5, time is illustrated along a horizontal axis, while frequency is illustrated along a vertical axis. The time-frequency resources of the UL-centric slot 500 may be divided into a DL burst 502, an UL traffic region 504 and an UL burst 506.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 504. The UL traffic region 504 may sometimes be referred to as the payload of the UL-centric slot. The UL traffic region 504 may include the communication resources utilized to communicate UL user data traffic from the scheduled entity 106 (e.g., UE) to the scheduling entity 108 (e.g., eNB). In some configurations, the UL traffic region 504 may be a physical UL shared channel (PUSCH). As illustrated in FIG. 5, the end of the DL burst 502 may be separated in time from the beginning of the UL traffic region 504. This time separation may sometimes be referred to as a gap, guard period, guard interval, and/or various other suitable terms. This separation provides time for the switch-over from DL communication (e.g., reception operation by the scheduled entity 106 (e.g., UE)) to UL communication (e.g., transmission by the scheduled entity 106 (e.g., UE)).

The UL burst 506 in FIG. 5 may be similar to the UL burst 406 described above with reference to FIG. 4. The UL burst 506 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

In legacy (e.g., 4G) wireless communication networks, such as the Long Term Evolution (LTE) wireless network, a UE may transmit UCI on only one of either the PUCCH or the PUSCH within a single subframe in order to maintain a low peak to average power ratio (PAPR). However, in 5G NR wireless communication networks, UCI may be transmitted within both the PUSCH (e.g., traffic region 504) and PUCCH (e.g., UL burst 506) of an UL-centric slot 500.

In addition, in legacy (e.g., 4G) wireless communication networks, such as the Long Term Evolution (LTE) wireless network, PUCCH resources are typically allocated semi-statically using higher layer signaling (e.g., radio resource control (RRC) signaling), while PUSCH resources are typically allocated dynamically using dynamic signaling (e.g., as downlink control information (DCI) within the PDCCH). However, in next generation (e.g., 5G) wireless networks, such as the New Radio (NR) wireless network, PUCCH resources may be allocated both semi-statically and dynamically. Semi-statically granted PUCCH resources may carry, for example, periodic UCI, such as periodic scheduling requests, CQI, and HARQ feedback transmissions for periodic or semi-persistent downlink transmissions. Dynamically granted PUCCH or PUSCH resources may carry, for example, aperiodic UCI, such as HARQ feedback transmissions for regular downlink transmissions (e.g., not periodic or semi-persistent downlink transmissions), HARQ feedback transmissions for certain PDCCH information, and aperiodic CQI reports.

Figure 6:
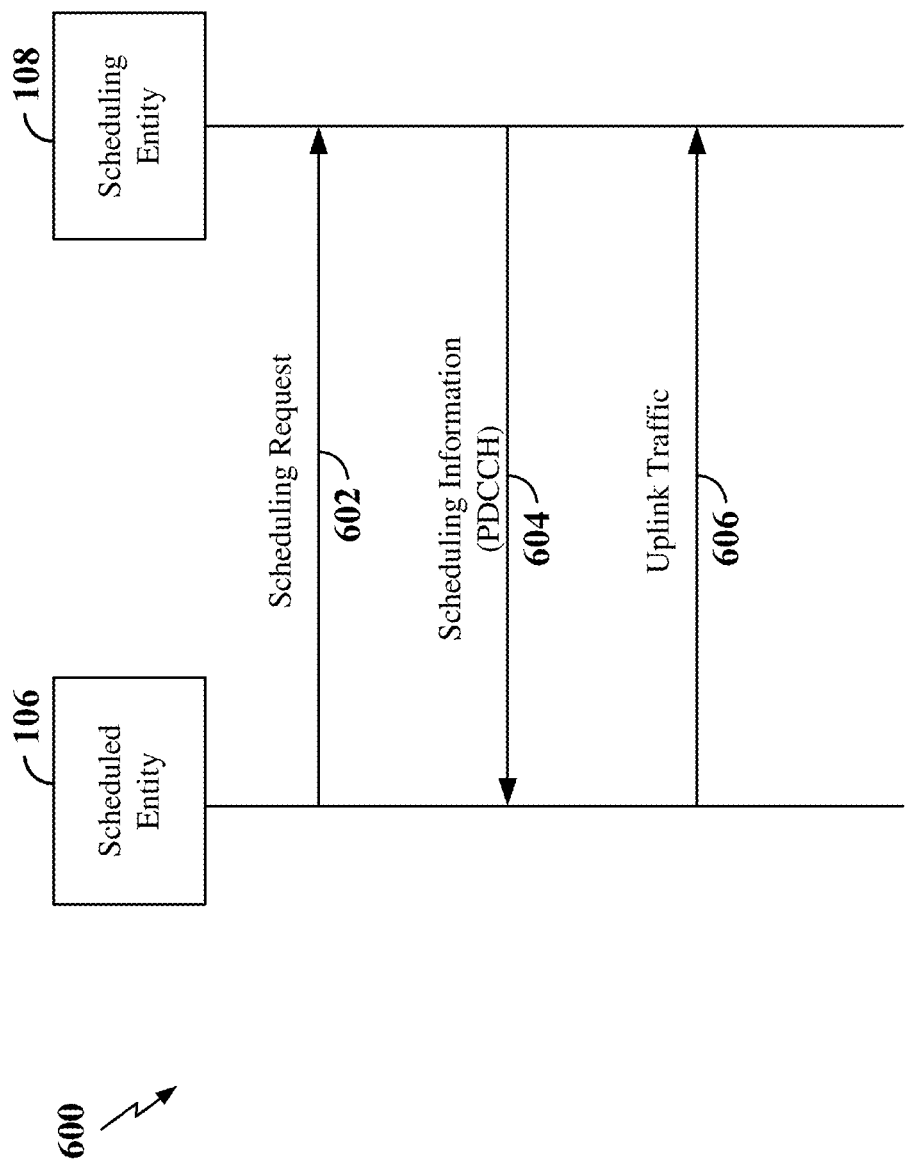
FIG. 6 is a signaling diagram illustrating exemplary signaling for dynamic scheduling.

FIG. 6 is a signaling diagram 600 illustrating exemplary signaling for dynamic scheduling according to some aspects of the present disclosure. When user data traffic arrives in an uplink buffer of a scheduled entity 106, at 602, the scheduled entity 106 may transmit a scheduling request to the scheduling entity 108 to request an uplink grant of time-frequency resources (e.g., resource elements/resource blocks) for the scheduled entity 106 to transmit the user data traffic to the scheduling entity 108. The scheduling request may be transmitted, for example, via the PUCCH within an UL burst of a DL-centric slot or an UL-centric slot.

In response to the scheduling request, the scheduling entity 108 may allocate a set of one or more resource elements (e.g. which may correspond to one or more resource blocks) to the scheduled entity 106, and at 604, transmit scheduling information corresponding to the uplink grant (e.g., information indicative of the assigned resource elements) to the scheduled entity 106. The scheduling information may be transmitted, for example, via the PDCCH within a DL burst of a DL-centric slot or an UL-centric slot. In some examples, the scheduling information may be masked (scrambled) with the cell radio network temporary identifier (C-RNTI) of the scheduled entity. At 606, the scheduled entity 106 may then utilize the assigned uplink resource element(s) to transmit the user data traffic to the scheduling entity 108. The assigned uplink resources for the traffic may be within the same slot as the PDCCH (e.g., when the PDCCH is transmitted in an UL-centric slot) or within a subsequent slot (e.g., when the PDCCH is transmitted in a DL-centric slot).

Figure 7:
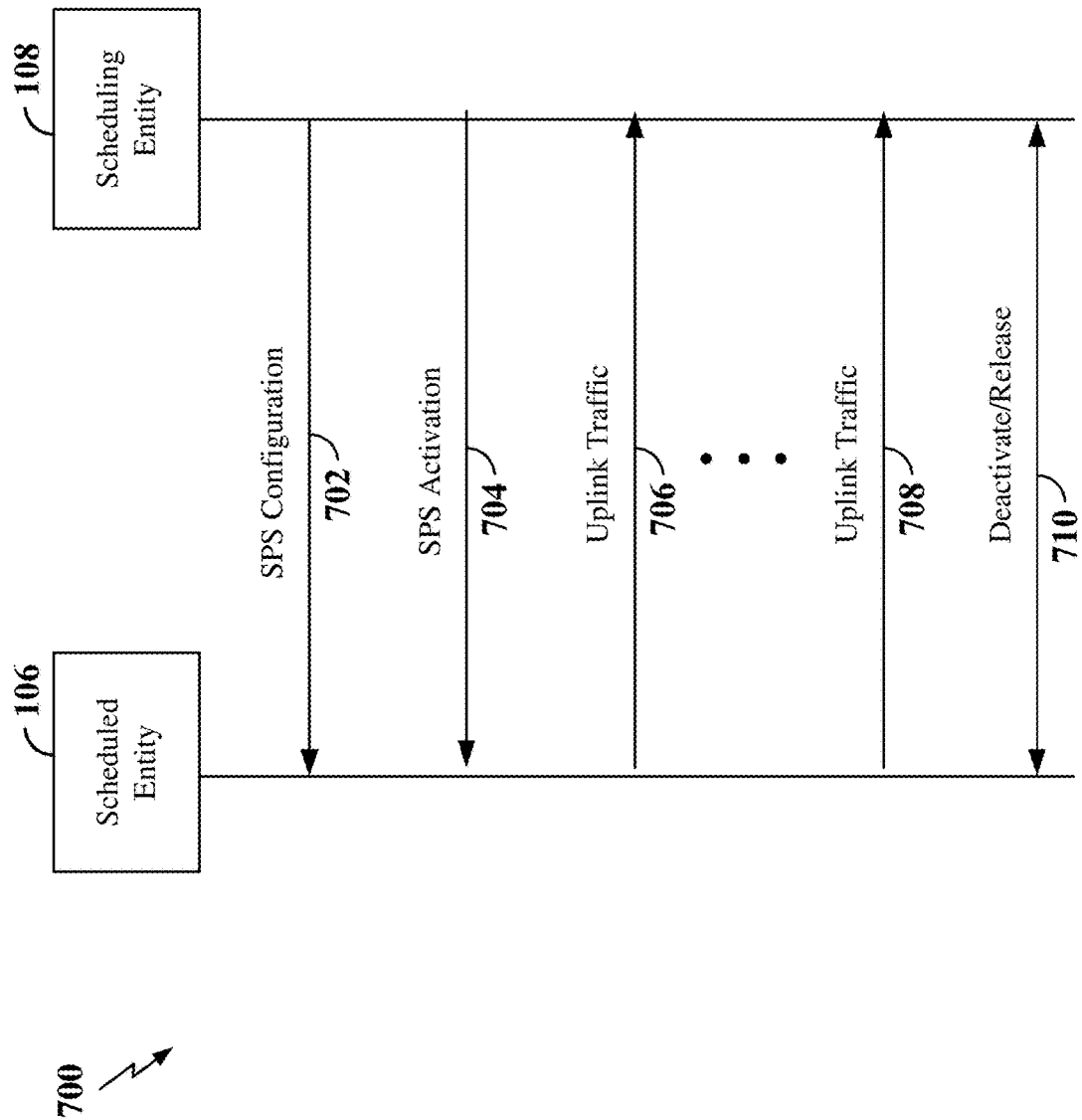
FIG. 7 is a signaling diagram illustrating exemplary signaling for semi-persistent scheduling.

FIG. 7 is a signaling diagram 700 illustrating exemplary signaling for semi-persistent scheduling (SPS) according to some aspects of the present disclosure. Generally, SPS may be used for periodic communications based on defined settings. For example, SPS may be suitable for applications with small, predictable, and/or periodic payloads, such as voice over Internet protocol (VoIP) applications. To avoid overwhelming the PDCCH, scheduling information corresponding to an uplink grant may be signaled just once on the PDCCH. Subsequently, without needing to receive additional scheduling information, the scheduled entity 106 may periodically utilize the resources allocated in the uplink grant. The periodicity with which the scheduled entity 106 may transmit user data traffic via the semi-persistently scheduled resources may be established when the SPS uplink grant is initially configured.

With reference to the diagram illustrated in FIG. 7, at 702, the scheduling entity 108 may configure SPS for a scheduled entity 106 and transmit scheduling information containing SPS configuration parameters to the scheduled entity 106. The SPS configuration message including the scheduling information may be transmitted, for example, via a PDCCH within a DL-burst of a DL-centric slot or an UL-centric slot. The SPS configuration parameters may include, for example, an indication of the allocated resources for the SPS uplink grant, a semi-persistent scheduling identifier (e.g., an SPS-RNTI) for the scheduled entity 106 and a periodicity of the SPS uplink grant. The SPS-RNTI may be assigned by the scheduling entity 108 and utilized to scramble subsequent transmissions related to the SPS uplink grant. Additional SPS configuration parameters may also include, but are not limited to, an implicit release time, cyclic shift DMRS configuration, modulation and coding scheme (MCS) and/or other parameters. The SPS uplink grant may be configured, for example, via a radio resource control (RRC) protocol.

The scheduling entity may configure the SPS grant at any time based on the service requirements of the scheduled entity 106 or in response to a request by the scheduled entity 106. For example, the scheduling entity 108 may configure the SPS grant based on the Quality of Service (QoS) to be provided to the scheduled entity and/or a type of traffic to be sent by the scheduling entity. In some examples, the scheduling entity 108 may configure the SPS uplink grant upon dedicated bearer establishment for a VoIP service. As another example, the scheduling entity 108 may configure the SPS uplink grant to meet a low-latency QoS requirement for one or more uplink packets.

Once configured, in order to begin using the SPS uplink grant, at 704, the scheduling entity 108 may then transmit an SPS activation message scrambled with the SPS-RNTI to the scheduled entity 106 to activate the SPS uplink grant and enable the scheduled entity 106 to utilize the SPS uplink grant based on the SPS configuration parameters. The SPS activation message may be transmitted, for example, via the PDCCH within a DL burst of a DL-centric slot or an UL-centric slot. At 706 and 708, the scheduled entity 106 may then utilize the assigned uplink resources to periodically transmit uplink traffic to the scheduling entity within an UL-centric slot based on the periodicity of the SPS uplink grant. During periods of silence or when a data transfer is complete, at 710, the SPS uplink grant may be deactivated/released. For example, an explicit deactivation/release message may be transmitted from the scheduling entity 108 to the scheduled entity 106. In other examples, the scheduled entity 106 may initiate an inactivity timer with the implicit release time received as part of the SPS configuration parameters, and when the inactivity timer expires, the scheduled entity 106 may release the SPS uplink resources.

While the SPS uplink grant is activated, the allocated uplink resources, MCS and other SPS configuration parameters remain fixed. However, retransmissions (e.g., HARQ retransmissions) may be dynamically scheduled between SPS intervals using the SPS-RNTI. In addition, if the radio link conditions change, a new SPS uplink grant may need to be configured and activated.

As indicated above, PUCCH resources may be allocated both semi-statically, as shown in FIG. 7, and dynamically, as shown in FIG. 6. By providing flexibility in UCI resource allocation in 5G NR wireless networks, UCI resource grants to a particular UE for periodic UCI (e.g., semi-static UCI resource grants) may occur near in time or overlap in time with UCI resource grants to that particular UE for aperiodic UCI (e.g., dynamic UCI resource grants). Similarly, dynamic UCI resource grants to a UE may occur near in time or overlap in time with other dynamic UCI resource grants for that UE, and semi-static UCE resource grants to a UE may also occur near in time or overlap in time with other semi-static UCI resource grants for that UE. For example, multiple semi-static UCI resource grants may be allocated to a UE, each configured for different UCI (e.g., one grant for periodic or SPS feedback information, one grant for scheduling requests, and one grant for periodic CQI). The semi-static UCI resource grants may have different periodicities, different starting offsets or different transmission patterns in time.

In accordance with various aspects of the present disclosure, to manage various UCI resource grants for a particular UE, various grant selection rules may be defined to enable the UE to select one or more of the UCI resource grants allocated within a particular period of time. For example, referring now to FIG. 8, three time periods $T_1$, $T_2$, and $T_3$ are illustrated. In some examples, each time period $T_1$, $T_2$, and $T_3$ may include, for example, one or more transmission time intervals (TTIs). As used herein, the term TTI refers to a set of one or more OFDM symbols, a mini-slot, a slot, or a set of slots.

Figure 9:
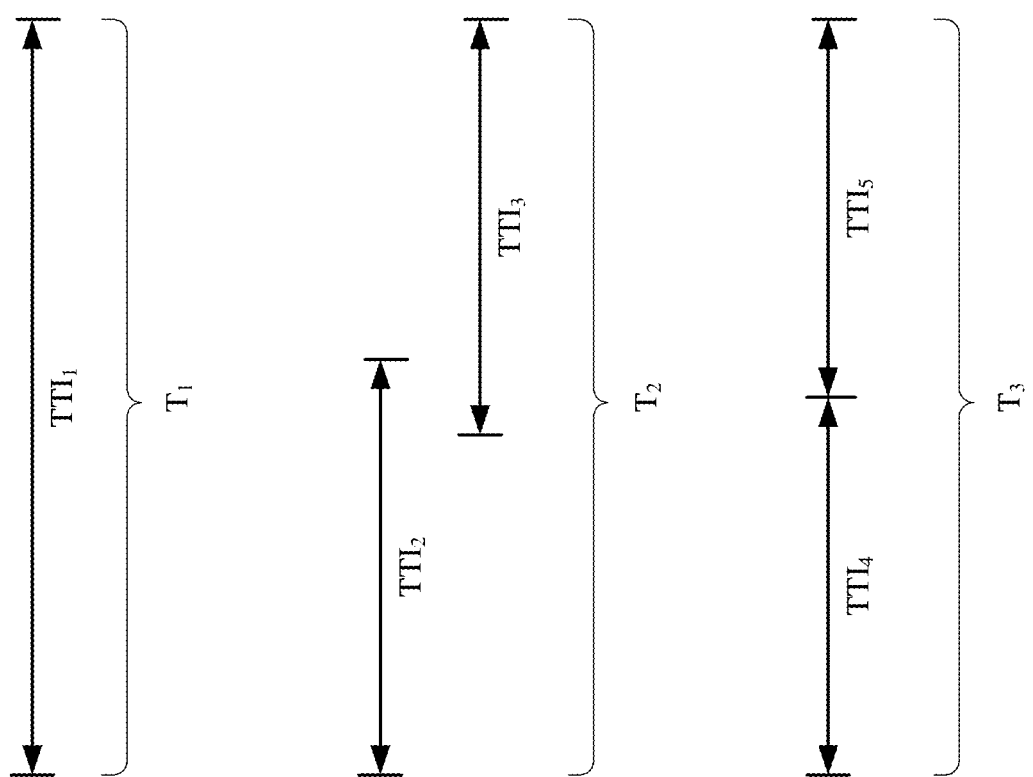
FIG. 9 is a diagram illustrating a time period including one or more transmission time intervals (TTIs) according to some aspects of the present disclosure.

In some examples, as shown in FIG. 9, a time period (e.g., time period $T_1$) includes a single TTI, denoted $TTI_1$ (e.g., the UCI resource grants are allocated within the same TTI). In other examples, a time period (e.g., time period $T_2$) includes two or more overlapping TTIs ($TTI_2$ and $TTI_3$). In still other examples, a time period (e.g., time period $T_3$) includes two or more non-overlapping TTIs (e.g., $TTI_4$ and $TTI_5$) defined by a time period between a start and/or end of a first transmission time interval $TTI_4$ of the two or more non-overlapping transmission time intervals and a start and/or end of a second transmission time interval $TTI_5$ of the two or more non-overlapping transmission time intervals. In the example shown in FIG. 9, time period $T_3$ is defined as the time period between the start of the first transmission time interval $TTI_4$ and the end of the second transmission time interval $TTI_5$.

Referring again to FIG. 8, in $T_1$, there are two UCI resource grants 802 and 804, each allocating a respective set of resource elements for UCI (UCI-1 and UCI-2). UCI resource grants 802 and 804 are contained within the same time period $T_1$, though not overlapping in time. Similarly, in $T_2$, there are two UCI resource grants 806 and 808, each allocating a respective set of resource elements for UCI (UCI-3 and UCI-4). In $T_2$, UCI resource grants 806 and 808 partially overlap one another in time. Likewise, in $T_3$, there are two UCI resource grants 810 and 812, each allocating a respective set of resource elements for UCI (UCI-4 and UCI-5). In $T_3$, UCI resource grant 810 spans the duration of the time period $T_3$, and UCI resource grant 812 is completely contained within UCI resource grant 810.

Therefore, in each of $T_1$, $T_2$ and $T_3$, the UE would apply the grant selection rules to select one or more of the UCI resource grants in each of the time periods and transmit UCI on the selected resource elements. For example, in $T_1$, the UE may select UCI resource grant 802 and/or 804 to transmit UCI-1 and/or UCI-2. In addition, in $T_2$, the UE may select UCI resource grant 806 and/or 808 to transmit UCI-3 and/or UCI-4, while in $T_3$, the UE may select UCI resource grant 810 and/or 812 to transmit UCI-5 and/or UCI-6.

In some aspects of the disclosure, a UE may be configured with a threshold corresponding to the time period and determine whether a time difference between a first UCI resource grant and a second UCI resource grant is less than the threshold. The time difference may be determined from the start or end of the first UCI resource grant to the start or end of the second UCI resource grant. If the time difference is less than the threshold (e.g., the first and second UCI resource grants occur within the same time period), the UE may utilize preconfigured grant selection rules to select one or both of the UCI resource grants to transmit UCI.

Figure 8:
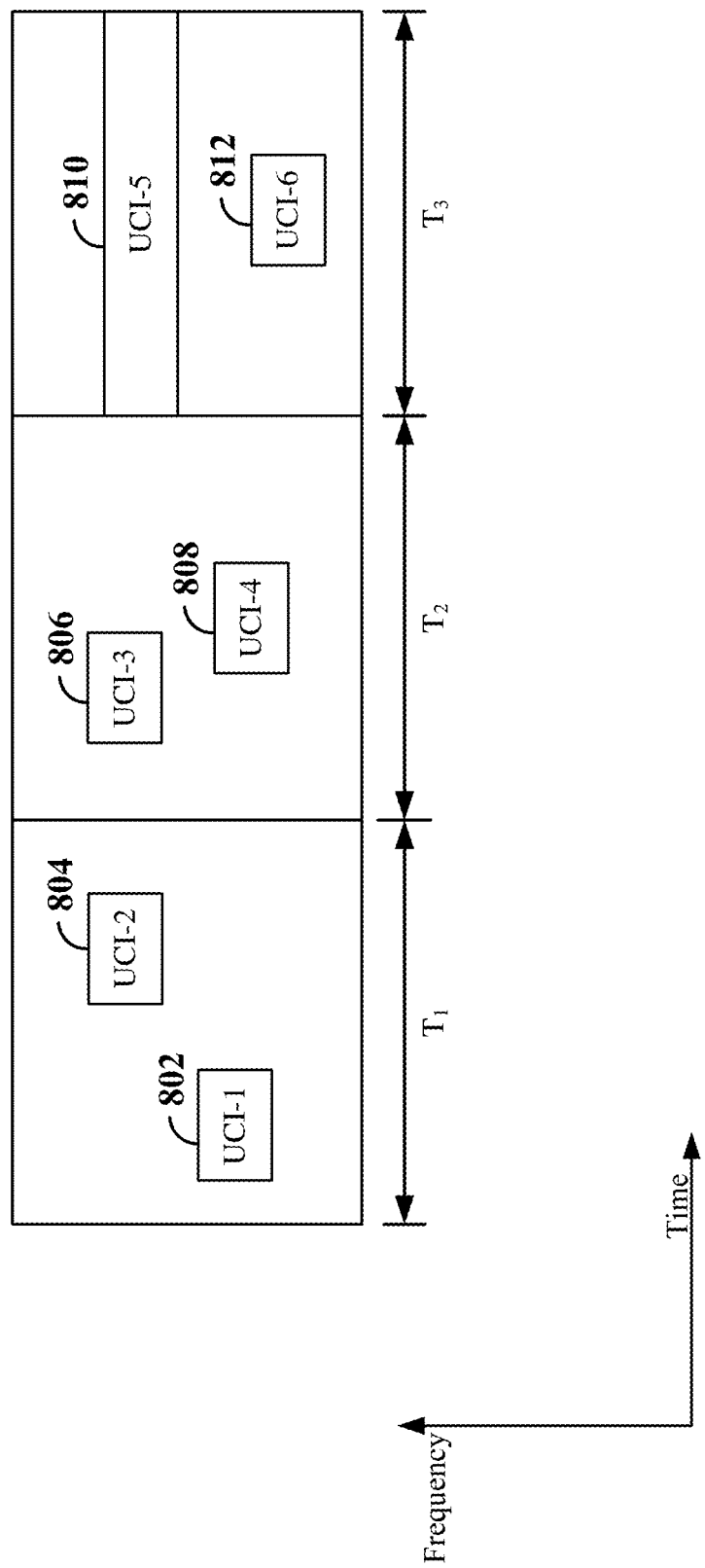
FIG. 8 is a diagram illustrating examples of multiple uplink control information (UCI) resource grants occurring within a given period of time according to some aspects of the present disclosure.
Figure 10:
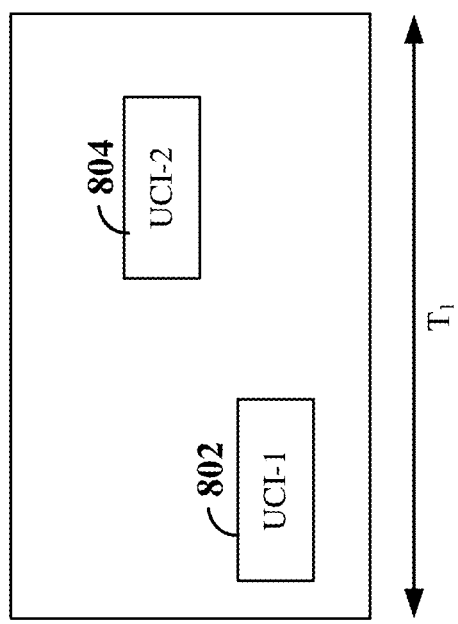
FIG. 10 is a diagram illustrating an example of selecting one or more UCI resource grants to transmit UCI in a given time period according to some aspects of the present disclosure.

In some examples, as shown in FIG. 10, which illustrates an example of time period $T_1$ of FIG. 8, the grant selection rules may cause the UE to select each of the UCI resource grants 802 and 804 without modifying either of the UCI resource grants 802 and 804, and transmit on the uplink resources assigned by each grant, the UCI that the grant was assigned to transmit. For example, the resources allocated for UCI-1 and UCI-2 may each be selected, such that UCI-1 may be transmitted on UCI resource grant 802 and UCI-2 may be transmitted on UCI resource grant 804.

Figure 11:
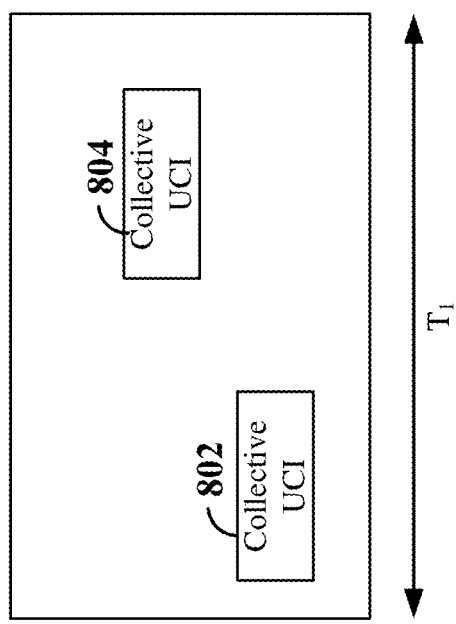
FIG. 11 is a diagram illustrating another example of selecting one or more UCI resource grants to transmit UCI in a given time period according to some aspects of the present disclosure.

In some examples, as shown in FIG. 11, which illustrates another example of time period $T_1$ of FIG. 8, the grant selection rules may cause the UE to select at least two of the UCI resource grants and to combine the resources allocated to each of the selected UCI resource grants into a single UCI resource grant. The UE may then multiplex the UCI for each of the UCI resource grants within the single UCI resource grant. For example, UCI resource grants 802 and 804 may be combined into a single UCI resource grant 1100 and the UE may multiplex the collective UCI (combination of UCI-1 and UCI-2) across both UCI resource grants 802 and 804. If at least one of the UCI resource grants is a dynamic UCI resource grant, the base station (e.g., gNB) may need to utilize multiple decoding hypotheses to decode the UCI to guard against the UE failing to decode the DCI including the dynamic UCI resource grant. For example, one decoding hypothesis may decode each UCI resource grant separately, while another decoding hypothesis may decode the combined single UCI resource grant.

If the individual UCI resource grants are each PUCCH resource grants, the single UCI resource grant may be treated as a PUCCH resource grant. However, if one or more of the individual UCI resource grants is a PUSCH resource grant, the single UCI resource grant may be treated as a PUSCH resource grant. Multiplexing the UCI over multiple UCI resource grants may provide for increased coding gain due to the larger block size. If multiple dynamic UCI resource grants are combined, the DCI for each dynamic UCI resource grant may be received in the same slot or in different slots. For example, a dynamic PUCCH grant received in slot n, applied to slot n+k may be combined with a subsequent PUCCH/PUSCH grant received in slot n+k', where k'<k.

However, referring again to FIG. 8, if the UCI resource grants overlap in time, as shown in $T_3$, and FDM or CDM is utilized for transmission of the UCI associated with each of the UCI resource grants, intermodulation distortion may occur for non-contiguous frequency transmissions through the same power amplifier (PA). In addition, the PAPR may also be impacted when a low PAPR waveform (e.g., a DFT-s-OFDM waveform) is utilized. Therefore, in other examples, instead of combining the resources allocated for at least two UCI resource grants into a single UCI resource grant, the grant selection rules may cause the UE to select only one or less than all of the UCI resource grants within the period of time.

For example, if both a semi-static UCI resource grant for transmitting periodic UCI and a dynamic UCI resource grant for transmitting aperiodic UCI are allocated within the same period of time (e.g., $T_2$ or $T_3$), the grant selection rules may cause the UE to select either the semi-static UCI resource grant or the dynamic UCI resource grant. In some examples, if the semi-static UCI resource grant is selected, the UE may multiplex the periodic UCI and at least part of the aperiodic UCI (associated with the dynamic UCI resource grant) on the resources allocated to the semi-static UCI resource grant. Similarly, if the dynamic UCI resource grant is selected, the UE may multiplex both the periodic UCI and aperiodic UCI on the resources allocated to the dynamic UCI resource grant.

Figure 12:
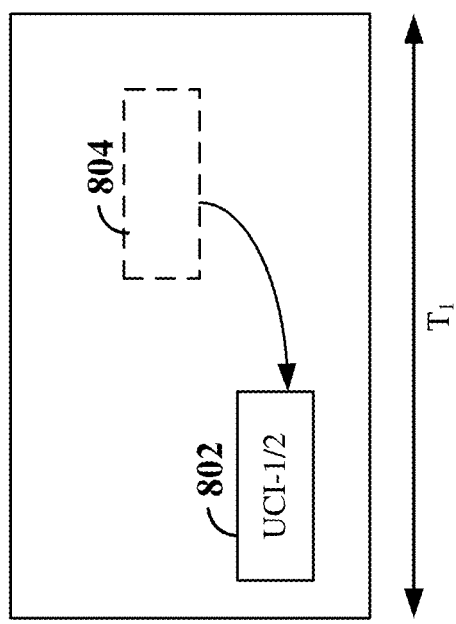
FIG. 12 is a diagram illustrating another example of selecting one or more UCI resource grants to transmit UCI in a given time period according to some aspects of the present disclosure.

For example, as shown in FIG. 12, which illustrates another example of the time period $T_1$ of FIG. 8, if UCI resource grant 802 corresponds to a semi-static UCI resource grant and UCI resource grant 804 corresponds to a dynamic UCI resource grant, at least part of the aperiodic UCI (UCI-2) that would have been transmitted within UCI resource grant 804 may be multiplexed with the periodic UCI (UCI-1) transmitted within UCI resource grant 802. If the aperiodic UCI payload is small enough, all of the aperiodic UCI may be multiplexed with the periodic UCI on the resources allocated to the semi-static UCI resource grant 802. In this example, the base station may again need to utilize multiple decoding hypotheses to guard against the UE failing to decode the DCI including the dynamic UCI resource grant.

In some examples, instead of the DCI containing the dynamic UCI resource grant indicating the specific resources allocated to the dynamic UCI resource grant, the DCI may include a dynamic resource trigger identifying the specific aperiodic UCI to transmit. The dynamic resource trigger may then be used by the UE to determine the specific resources that would have been allocated to the dynamic UCI resource grant (e.g., by using a look-up table or accessing other configuration information, or information about the downlink resource on which the DCI was transmitted). The UE may then further determine that those resources would occur within the same time period as semi-static uplink resources and multiplex at least part of the aperiodic UCI with the periodic UCI within the allocated semi-static uplink resources. In other examples, instead of causing the UE to determine the specific resources that would have been allocated to the dynamic UCI resource grant, the dynamic resource trigger may simply trigger the UE to transmit at least a portion of the indicated aperiodic UCI within the resources allocated to the semi-static UCI resource grant. In this way, the resources that would have been allocated to the dynamic UCI resource grant may be reassigned by the base station to another UE.

As another example, if UCI resource grant 804 corresponds to a semi-static UCI resource grant and UCI resource grant 802 corresponds to a dynamic UCI resource grant, at least part of the periodic UCI (UCI-2) that would have been transmitted within UCI resource grant 804 may be multiplexed with the aperiodic UCI (UCI-1) transmitted within UCI resource grant 802. In this example, the semi-static resources may be reassigned by the base station to another UE. However, interference may result if the UE is unable to decode the dynamic UCI resource grant and transmits on the resources allocated to the semi-static UCI resource grant.

Referring again to FIG. 8, in still other examples, the grant selection rules may cause the UE to select the UCI resource grant that occurs earliest in time (e.g., begins first or ends first) or that includes the large. For example, within time period $T_2$, the UE may select UCI resource grant 802 since it occurs earlier in time. In some examples, if there is a tie between the UCI resource grants (e.g., each of the UCI resource grants begins or ends at the same time or has the same amount of resources allocated to it), the grant selection rules may cause the UE to select either the dynamic UCI resource grant or the semi-static UCI resource grant.

Figure 13:
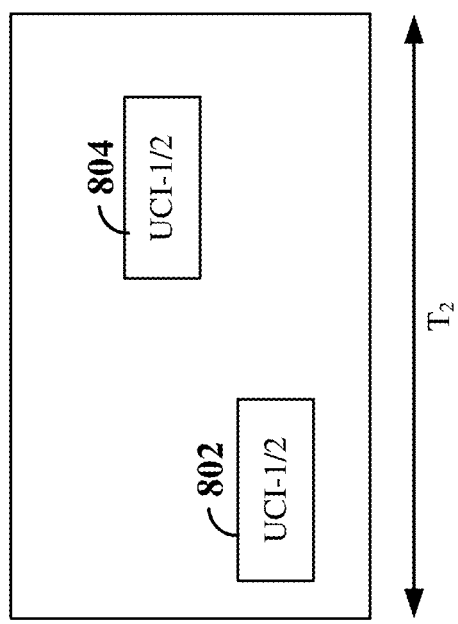
FIG. 13 is a diagram illustrating another example of selecting one or more UCI resource grants to transmit UCI in a given time period according to some aspects of the present disclosure.

In some examples, the grant selection rules may cause the UE to select each of the UCI resource grants, combine the UCI for each of the selected UCI resource grants, and to transmit the combined UCI on each of the selected UCI resource grants. For example, as shown in FIG. 13, which illustrates another example of time period $T_1$ of FIG. 8, UCI-1 and UCI-2, which would have each been separately transmitted on respective UCI resource grants 802 and 804, may be combined and the combined UCI (UCI-1/4) may be transmitted on both UCI resource grant 802 and UCI resource grant 804. Thus, the UCI is effectively repeated on two or more different PUCCH and/or PUSCH transmissions. Again, the base station may need to utilize multiple decoding hypotheses to guard against the UE failing to decode DCI including a dynamic UCI resource grant.

Figure 14:
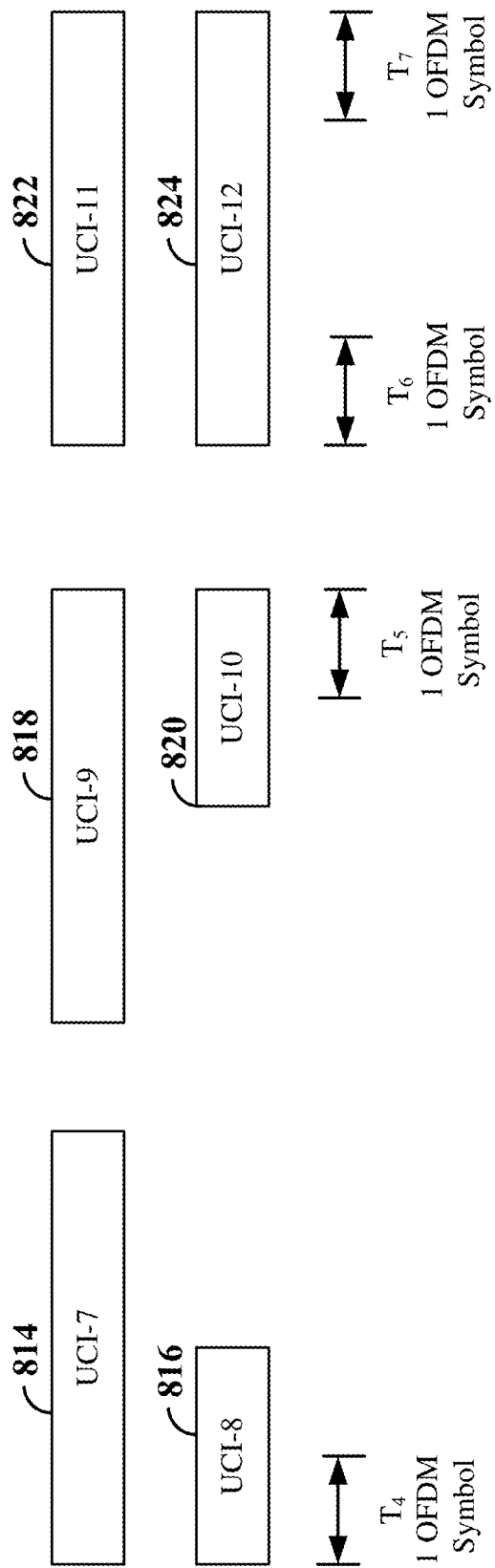
FIG. 14 is a diagram illustrating examples of a threshold set equal to a time period of one OFDM symbol to determine an alignment of the start and/or end of UCI resource grants according to some aspects of the present disclosure.

In some examples, as shown in FIG. 14, which illustrates examples of a threshold set equal to a time period of one OFDM symbol, the time difference may be determined between a start and/or end of two UCI resource grants to determine an alignment of the start and/or end of the UCI resource grants. For example, the threshold may correspond to time period $T_4$, which is shown equal to one OFDM symbol. If the time difference between respective starts of two UCI resource grants 814 and 816 is less than the threshold (e.g., $T_4$), the respective starts of UCI resource grants 814 and 816 may be considered aligned in time. In this example, the UE may utilize preconfigured grant selection rules to select one of the starting-aligned UCI resource grants 814 and 816. In some examples, the UE may select one of the UCI resource grants (e.g., UCI resource grant 814), combine (e.g., multiplex) at least a portion of the UCI from UCI resource grant 816 with the UCI for UCI resource grant 814 and transmit the combined UCI on UCI resource grant 814, as described above in connection with FIG. 12.

As another example, the threshold may correspond to time period $T_5$, which is shown equal to one OFDM symbol. If the time difference between respective ends of two UCI resource grants 818 and 820 is less than the threshold (e.g., $T_5$), the respective ends of UCI resource grants 818 and 820 may be considered aligned in time. In this example, the UE may utilize preconfigured grant selection rules to select one of the ending-aligned UCI resource grants 818 and 820. In some examples, the UE may select one of the UCI resource grants (e.g., UCI resource grant 818), combine (e.g., multiplex) at least a portion of the UCI from UCI resource grant 820 with the UCI for UCI resource grant 818 and transmit the combined UCI on UCI resource grant 818, as described above in connection with FIG. 12.

As another example, the threshold may include two thresholds, each corresponding to a respective time period $T_6$ and $T_7$, each of which is shown equal to one OFDM symbol. If the time difference between respective starts of two UCI resource grants 822 and 824 is less than the first threshold (e.g., $T_6$), the respective starts of UCI resource grants 822 and 824 may be considered aligned in time. In addition, if the time difference between respective ends of the two UCI resource grants 822 and 824 is less than the second threshold (e.g., $T_7$), the respective ends of UCI resource grants 822 and 824 may be considered aligned in time. As such, the two UCI resource grants 822 and 824 may be considered completely aligned in time. In this example, the UE may utilize preconfigured grant selection rules to select one of the completely aligned UCI resource grants 822 and 824. In some examples, the UE may select one of the UCI resource grants (e.g., UCI resource grant 822), combine (e.g., multiplex) at least a portion of the UCI from UCI resource grant 824 with the UCI for UCI resource grant 822 and transmit the combined UCI on UCI resource grant 822, as described above in connection with FIG. 12.

In various aspects of the present disclosure, the grant selection rules may include rules based on various factors. In some examples, the grant selection rules may be based on a payload type and/or payload size of each of the UCI. In some examples, a payload type may include a payload priority. For example, ultra-reliable low-latency communication (URLLC) payloads may have a higher priority than enhanced mobile broadband (eMBB), and thus the grant selection rules may cause the UE to select the grant that is earlier in time if the payloads convey information for URLLC traffic (e.g., URLLC uplink user data traffic or acknowledgement information for URLLC downlink user data traffic). As another example, if a semi-static UCI resource grant includes only a scheduling request, the grant selection rules may cause the UE to select the dynamic UCI resource grant and multiplex the scheduling request with the periodic UCI in the dynamic UCI resource grant. As another example, if a semi-static UCI resource grant includes only periodic CQI and the dynamic UCI resource grant includes feedback information (e.g., an ACK/NACK payload), the grant selection rules may cause the UE to select the semi-static UCI resource grant and multiplex the ACK/NACK payload up to a certain number of bits (e.g., ≤N bits) with the periodic CQI in the semi-static UCI resource grant.

In some examples, the grant selection rules may be based on the time resources and/or frequency resources allocated to each of the UCI resource grants. For example, the grant selection rules may cause the UE to avoid selecting both of the UCI resource grants within a time period when FDM is utilized and the frequency resources in each of the UCI resource grants are separated by more than a certain number of resource blocks. As another example, if the dynamic UCI resource grant is later or earlier in time than the semi-static UCI resource grant, the grant selection rules may cause the UE to select the dynamic UCI resource grant or the semi-static UCI resource grant. In some examples, if the semi-static UCI resource grant includes a scheduling request, delaying the transmission of the scheduling request may allow an opportunity to send a more recent scheduling request, assuming extra latency is acceptable.

In some examples, the grant selection rules may be based on a waveform type and/or a transmit-diversity scheme of each of the UCI resource grants. For example, if FDM is utilized with a DFT-s-OFDM waveform, the grant selection rules may cause the UE to select only one of the UCI resource grants. As another example, if the UCI resource grants have different transmit-diversity schemes, the grant selection rules may cause the UE to select each of the UCI resource grants without modifying any of the UCI resource grants.

The grant selection rules described herein may apply to grants for UCI resources that lie in the same component carrier or in different component carriers. Further, the grant selection rules may depend on the indices of the component carriers in which the UCI resources lie. For example, the component carriers may be divided into groups, and combining of UCI resources from multiple UCI resource grants may be allowed only for resources lying within the same group.

Figure 15:
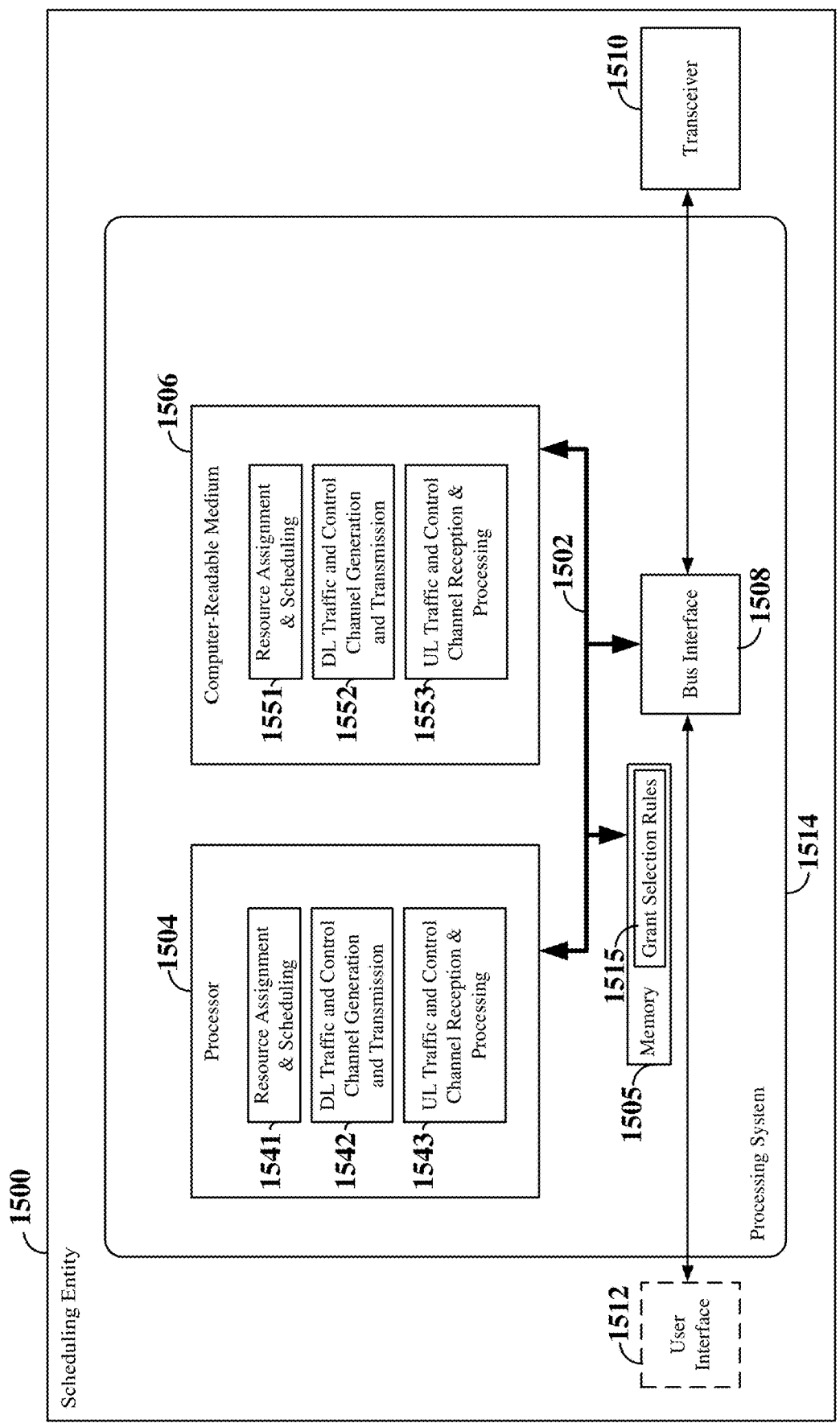
FIG. 15 is a block diagram illustrating an example of a hardware implementation for a scheduling entity employing a processing system according to some aspects of the present disclosure.

FIG. 15 is a conceptual diagram illustrating an example of a hardware implementation for an exemplary scheduling entity 1500 employing a processing system 1514. For example, the scheduling entity 1500 may be a next generation (5G) base station as illustrated in any one or more of FIGS. 1 and 2. In another example, the scheduling entity 1500 may be a user equipment (UE) as illustrated in any one or more of FIGS. 1 and 2.

The scheduling entity 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1500 may be configured to perform any one or more of the functions described herein. That is, the processor 1504, as utilized in a scheduling entity 1500, may be used to implement any one or more of the processes described below. The processor 1504 may in some instances be implemented via a baseband or modem chip and in other implementations, the processor 1504 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a means for communicating with various other apparatus over a transmission medium (e.g., air interface). Depending upon the nature of the apparatus, a user interface 1512 (e.g., keypad, display, speaker, microphone, joystick) may also be provided.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1504 may include circuitry configured for various functions. For example, the processor 1504 may include resource assignment and scheduling circuitry 1541, configured to generate, schedule, and modify a resource assignment or grant of time-frequency resources (e.g., a set of one or more resource elements). For example, the resource assignment and scheduling circuitry 1541 may schedule time-frequency resources within a plurality of time division duplex (TDD) and/or frequency division duplex (FDD) subframes, slots, and/or mini-slots to carry data and/or control information to and/or from multiple UEs (scheduled entities).

In various aspects of the disclosure, the resource assignment and scheduling circuitry 1541 may be configured to schedule multiple UCI resource grants for a single scheduled entity to transmit UCI within a particular time period. Each of the UCI resource grants may be a dynamic UCI resource grant for transmitting aperiodic UCI or a semi-static UCI resource grant for transmitting periodic UCI. The resource assignment and scheduling circuitry 1541 may further operate in coordination with resource assignment and scheduling software 1551.

The processor 1504 may further include downlink (DL) traffic and control channel generation and transmission circuitry 1542, configured to generate and transmit downlink user data traffic and control channels within one or more subframes, slots, and/or mini-slots. The DL traffic and control channel generation and transmission circuitry 1542 may operate in coordination with the resource assignment and scheduling circuitry 1541 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information.

For example, the DL traffic and control channel generation and transmission circuitry 1542 may be configured to generate a physical downlink control channel (PDCCH) (or Enhanced PDCCH (ePDCCH)) including downlink control information (DCI). In some examples, one or more of the DCI may include control information indicating a dynamic grant of uplink resources for a scheduled entity to transmit aperiodic UCI. The DL traffic and control channel generation and transmission circuitry 1542 may further be configured to generate radio resource control (RRC) signaling including a semi-persistent grant of uplink resources for a scheduled entity to transmit periodic UCI.

The DL traffic and control channel generation and transmission circuitry 1542 may further be configured to transmit grant selection rules 1515 to one or more scheduled entities. The grant selection rules 1515 may be maintained, for example, in memory 1505. In some examples, the DL traffic and control channel generation and transmission circuitry 1542 may generate the grant selection rules for one or more scheduled entities. In other examples, the grant selection rules 1515 may be preconfigured and stored in memory 1505. A single set of grant selection rules 1515 may be applicable to any scheduled entity or separate sets of grant selection rules 1515 may be generated for different scheduled entities. For example, each scheduled entity may have a respective set of grant selection rules associated therewith or each type of scheduled entity (e.g., scheduled entities that share particular features) may have a respective set of grant selection rules associated therewith. The grant selection rules 1515 may be transmitted, for example, within a master information block (MIB), system information block (SIB), or other control channel. In other examples, the grant selection rules 1515 may be preconfigured on the scheduling entity 1500 and scheduled entities and the particular grant selection rules for a scheduled entity may be determined based on device information associated with the scheduled entity (e.g., particular features of the scheduled entity).

The DL traffic and control channel generation and transmission circuitry 1542 may further be configured to generate a physical downlink shared channel (PDSCH) (or Enhanced PDSCH (ePDSCH)) including downlink user data traffic. The DL traffic and control channel generation and transmission circuitry 1542 may further operate in coordination with DL traffic and control channel generation and transmission software 1552.

The processor 1504 may further include uplink (UL) traffic and control channel reception and processing circuitry 1543, configured to receive and process uplink control channels and uplink traffic channels from one or more scheduled entities. For example, the UL traffic and control channel reception and processing circuitry 1543 may be configured to receive periodic and/or aperiodic UCI on uplink resources allocated to one or more semi-static and/or dynamic UCI resource grants. The UL traffic and control channel reception and processing circuitry 1543 may further be configured to access the grant selection rules 1515 to determine the specific UCI resource grants that will be selected by a particular scheduled entity during a particular time period. The grant selection rules 1515 may further indicate whether UCI from separate UCI resource grants may be combined within a single particular UCI resource grant, whether UCI from separate UCI resource grants may be multiplexed across the UCI resource grants, or whether UCI from separate UCI resource grants may be combined and repeated within each of the UCI resource grants. The UL traffic and control channel reception and processing circuitry 1543 may further be configured to maintain multiple decoding hypotheses for the UCI and apply one or more of the decoding hypotheses to decode the received UCI.

The UL traffic and control channel reception and processing circuitry 1543 may further be configured to receive uplink user data traffic from one or more scheduled entities. In addition, the UL traffic and control channel reception and processing circuitry 1543 may operate in coordination with the resource assignment and scheduling circuitry 1541 to schedule UL user data traffic transmissions, DL user data traffic transmissions and/or DL user data traffic retransmissions in accordance with the received UCI. The UL traffic and control channel reception and processing circuitry 1543 may further operate in coordination with UL traffic and control channel reception and processing software 1553.

Figure 16:
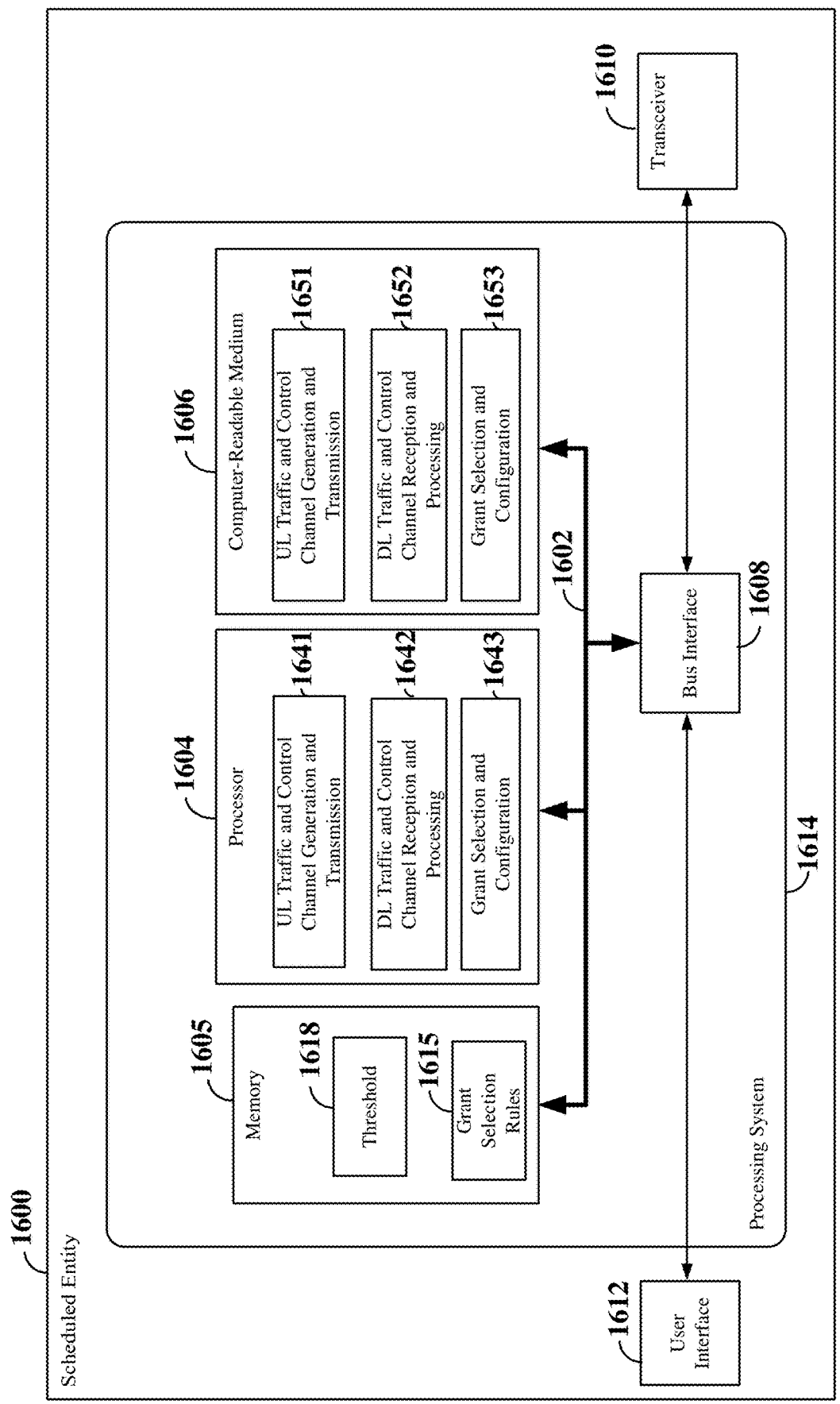
FIG. 16 is a block diagram illustrating an example of a hardware implementation for a scheduled entity employing a processing system according to some aspects of the present disclosure.

FIG. 16 is a conceptual diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) as illustrated in any one or more of FIGS. 1 and 2.

The processing system 1614 may be substantially the same as the processing system 1414 illustrated in FIG. 14, including a bus interface 1608, a bus 1602, memory 1605, a processor 1604, and a computer-readable medium 1606. Furthermore, the scheduled entity 1600 may include a user interface 1612 and a transceiver 1610 substantially similar to those described above in FIG. 7. That is, the processor 1604, as utilized in a scheduled entity 1600, may be used to implement any one or more of the processes described below.

In some aspects of the disclosure, the processor 1604 may include uplink (UL) traffic and control channel generation and transmission circuitry 1641, configured to generate and transmit uplink control/feedback/acknowledgement information on an UL control channel (e.g., a PUCCH) or UL traffic channel (e.g., a PUSCH). The UL traffic and control channel generation and transmission circuitry 1641 may further be configured to generate and transmit uplink user data traffic on an UL traffic channel (e.g., a PUSCH). The UL traffic and control channel generation and transmission circuitry 1641 may operate in coordination with UL traffic and control channel generation and transmission software 1661.

The processor 1604 may further include downlink (DL) traffic and control channel reception and processing circuitry 1642, configured for receiving and processing downlink user data traffic on a traffic channel, and to receive and process control information on one or more downlink control channels. For example, the DL traffic and control channel reception and processing circuitry 1642 may be configured to receive downlink control information (DCI) (e.g., within a PDCCH) including one or more dynamic UCI resource grants for aperiodic UCI. The DL traffic and control channel reception and processing circuitry 1642 may further be configured to receive RRC signaling including one or more semi-static UCI resource grants for periodic UCI. The DL traffic and control channel reception and processing circuitry 1642 may then provide the UCI resource grants to the UL traffic and control channel generation and transmission circuitry 1641 for use in transmitting UCI to the scheduling entity.

In some examples, the DL traffic and control channel reception and processing circuitry 1642 may further be configured to receive grant selection rules 1615 from the scheduling entity and to store the grant selection rules 1615 within memory 1605. In other examples, the grant selection rules 1615 may be preconfigured on the scheduled entity 1600 and scheduling entity. The DL traffic and control channel reception and processing circuitry 1642 may operate in coordination with DL traffic and control channel reception and processing software 1662.

The processor 1604 may further include grant selection and configuration circuitry 1643, configured to manage multiple UCI resource grants for the scheduled entity 1600. In some examples, the multiple UCI resource grants may include one or more semi-static UCI resource grants for periodic UCI and/or one or more dynamic UCI resource grants for aperiodic UCI. The grant selection and configuration circuitry 1643 may further be configured to determine whether two or more UCI resource grants occur within a given time period. For example, the grant selection and configuration circuitry 1643 may access a threshold 16116 maintained, for example, in memory 1605 and determine whether a time difference between a first UCI resource grant and a second UCI resource grant is less than the threshold. If the time difference is less than the threshold (e.g., the first and second UCI resource grants occur within the same time period), the grant selection and configuration circuitry 1643 may access the grant selection rules 1615 to select one or both of the UCI resource grants to transmit UCI. In some examples, the time difference is measured between respective starts and/or respective ends of the UCI resource grants.

In various aspects of the present disclosure, the grant selection rules 1615 may include rules based on various factors, as described above. In some examples, the grant selection rules may be based on a payload type and/or payload size of each of the UCI. The grant selection rules 1615 may further be based on the time resources and/or frequency resources allocated to each of the UCI resource grants. The grant selection rules 1615 may further be based on a waveform type and/or a transmit-diversity scheme of each of the UCI resource grants.

In some examples, the grant selection rules 1615 may cause the grant selection and configuration circuitry 1643 to select each of the UCI resource grants without modifying either of the UCI resource grants. In other examples, the grant selection rules 1615 may cause the grant selection and configuration circuitry 1643 to select at least two of the UCI resource grants and to combine the set of resource elements allocated to each of the selected UCI resource grants into a single UCI resource grant. The grant selection and configuration circuitry 1643 may then instruct the UL traffic and control channel generation and transmission circuitry 1641 to multiplex the UCI for each of the UCI resource grants within the single UCI resource grant.

In still other examples, the grant selection rules 1615 may cause the grant selection and configuration circuitry 1643 to select only one or less than all of the UCI resource grants allocated within the time period. For example, if both a semi-static UCI resource grant for transmitting periodic UCI and a dynamic UCI resource grant for transmitting aperiodic UCI are allocated within the time period, the grant selection rules 1615 may cause the grant selection and configuration circuitry 1643 to select either the semi-static UCI resource grant or the dynamic UCI resource grant.

If the semi-static UCI resource grant is selected, the grant selection and configuration circuitry 1643 may then instruct the UL traffic and control channel generation and transmission circuitry 1641 to multiplex the periodic UCI and at least part of the aperiodic UCI on the resources allocated to the semi-static UCI resource grant. If the dynamic UCI resource grant is selected, the grant selection and configuration circuitry 1643 may instruct the UL traffic and control channel generation and transmission circuitry 1641 to multiplex both the periodic UCI and dynamic UCI on the resources allocated to the dynamic UCI resource grant.

In still other examples, the grant selection rules 1615 may cause the grant selection and configuration circuitry 1643 to select the UCI resource grant that occurs earliest in time (e.g., begins first or ends first) or that includes the largest set of resources. In some examples, if there is a tie between the UCI resource grants (e.g., each of the UCI resource grants begins or ends at the same time or has the same amount of resources allocated to it), the grant selection rules 1615 may cause the grant selection and configuration circuitry 1643 to select either the dynamic UCI resource grant or the semi-static UCI resource grant. The periodic and aperiodic UCI may then be multiplexed, as indicated above.

In still other examples, the grant selection rules 1615 may cause the grant selection and configuration circuitry 1643 to select each of the UCI resource grants. The grant selection and configuration circuitry 1643 may then instruct the UL traffic and control channel generation and transmission circuitry 1641 to combine the UCI for each of the selected UCI resource grants, and to transmit the combined UCI on each of the selected UCI resource grants. The grant selection and configuration circuitry 1643 may operate in coordination with grant selection and configuration software 1663.

Figure 17:
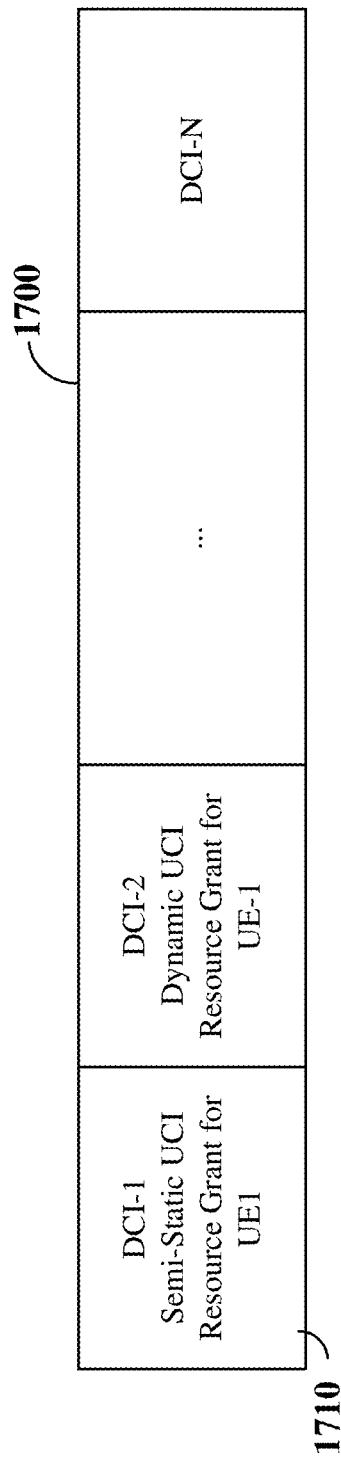
FIG. 17 is a diagram illustrating an example of a physical downlink control channel (PDCCH) carrying downlink control information according to some aspects of the present disclosure.

FIG. 17 is a diagram illustrating an example of a physical downlink control channel (PDCCH) 1700 carrying control information. As shown in FIG. 17, the PDCCH 1700 may include a plurality of downlink channel information (DCI) 1010 (e.g., DCI-1 ... DCI-N). Each DCI 1710 may include scheduling assignments (e.g., downlink assignments and/or uplink grants) for one or more scheduled entities.

In the example shown in FIG. 17, the PDCCH 1700 includes multiple DCIs 1710 for a single UE (e.g., UE1). For example, DCI-1 may include a semi-static (e.g., SPS) UCI resource grant for UE1, while DCI-2 may include a dynamic UCI resource grant for UE1. Thus, DCI-1 and DCI-2 may each include respective scheduling information indicating a set of one or more resource elements (e.g., time-frequency resources) allocated for the UCI resource grants. In addition, DCI-1 may each further include SPS configuration parameters for the SPS UCI resource grant. Additional DCI 1710 within the PDCCH 1700 or a subsequent PDCCH may include an activation for the SPS UCI resource grant to enable UE1 to begin to utilize the SPS UCI resource grant based on the SPS configuration parameters for the SPS UCI resource grant. To deactivate/release the SPS UCI resource grant, a subsequent PDCCH may include DCI that include an explicit deactivation/release of the SPS UCI resource grant.

Although multiple uplink grants are illustrated in FIG. 17 as being included within a single PDCCH, it should be understood that the different uplink grants for UE1 may be included in two or more PDCCH. For example, the SPS UCI resource grant may be included in one PDCCH, while the dynamic UCI resource grant is included in another PDCCH.

In some examples, instead of the DCI-1 or DCI-2 indicating the specific resources allocated to the UCI resource grant, the DCI-1 or DCI-2 may include a resource trigger identifying the specific UCI to transmit. In some examples, the resource trigger may then be used by the UE to determine the specific uplink resources that would have been allocated to the UCI resource grant (e.g., by using a look-up table or accessing other configuration information, or information about the downlink resource on which the DCI was transmitted).

Figure 18:
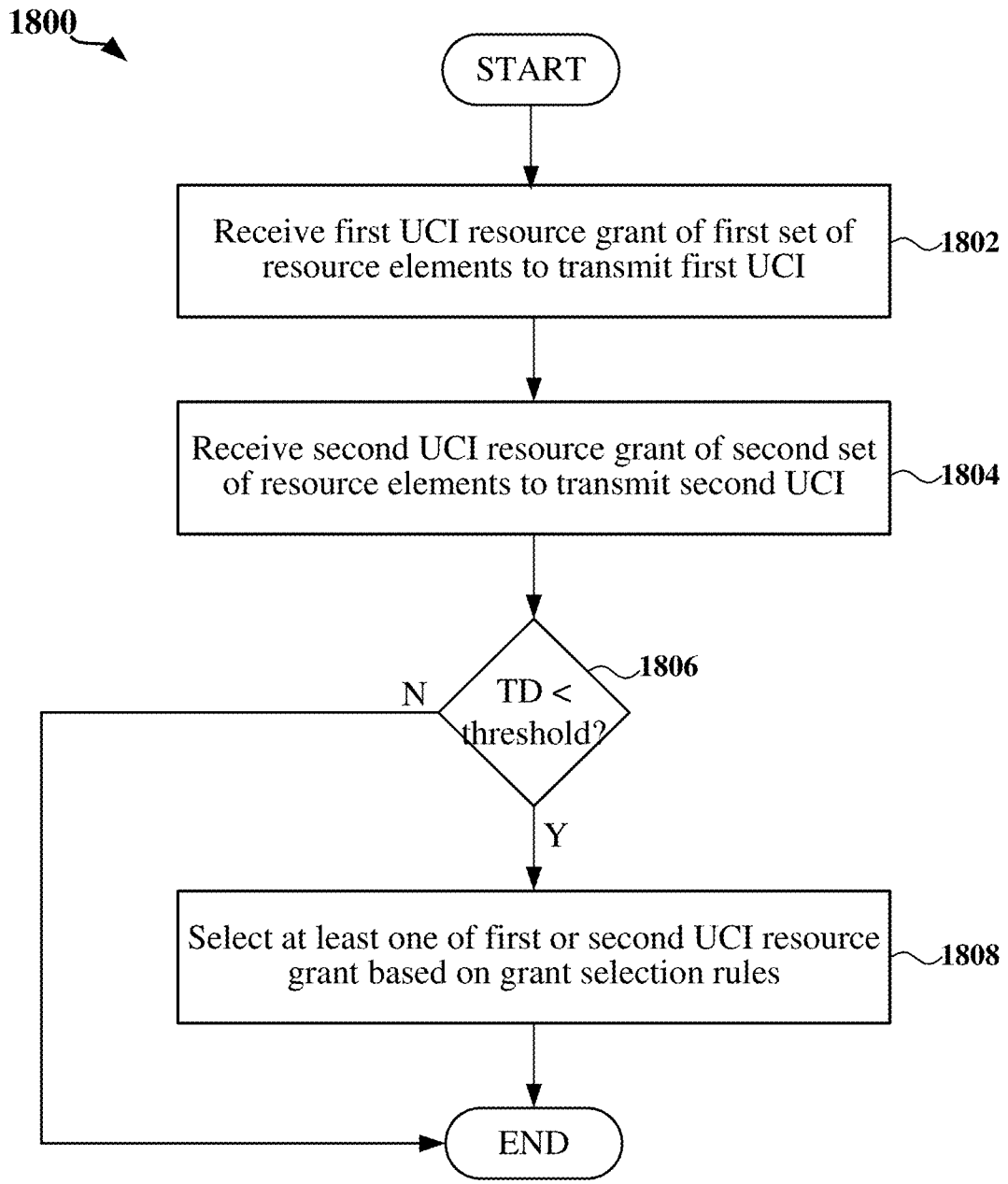
FIG. 18 is a flow chart illustrating an exemplary process for managing multiple uplink control information (UCI) resource grants to transmit UCI in a wireless communication network according to some aspects of the present disclosure.

FIG. 18 is a flow chart illustrating an exemplary process 1800 for managing multiple UCI resource grants to transmit uplink control information (UCI) in a wireless communication network according to some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity illustrated in FIG. 16. In some examples, the process 1800 may be carried out by any suitable apparatus or means for carrying out the functions or algorithm described below.

At block 1802, the scheduled entity may receive a first UCI resource grant allocating a first set of resource elements for use by the scheduled entity to transmit first uplink control information (UCI). For example, the first UCI resource grant may be a dynamic UCI resource grant for aperiodic UCI received, for example, within a PDCCH. As another example, the first UCI resource grant may be a semi-static UCI resource grant for periodic UCI received, for example, within a PDCCH and configured via higher level (e.g., RRC) signaling. At block 1804, the scheduled entity may receive a second UCI resource grant allocating a second set of resource elements for use by the scheduled entity to transmit second UCI. For example, the second UCI resource grant may be a dynamic UCI resource grant for aperiodic UCI received, for example, within a PDCCH. As another example, the second UCI resource grant may be a semi-static UCI resource grant for periodic UCI received, for example, within a PDCCH and configured via higher level (e.g., RRC) signaling. For example, the DL traffic and control channel reception and processing circuitry 1642 shown and described above in reference to FIG. 16 may receive the first and second UCI resource grants.

At block 1806, the scheduled entity may determine whether a time difference (TD) between the first set of resource elements for the first UCI resource grant and the second set of resource elements for the second UCI resource grant is less than a threshold. The time difference may be determined from the start or end of the first UCI resource grant to the start or end of the second UCI resource grant. In addition, the threshold may include at least one transmission time interval, each corresponding to a set of one or more orthogonal frequency division multiplexed (OFDM) symbols, a mini-slot, a slot, or a set of two or more slots. In some examples, the threshold may include a single transmission time interval, two overlapping transmission time intervals, or two non-overlapping transmission time intervals. For example, the grant selection and configuration circuitry 1643 shown and described above in reference to FIG. 16 may determine the time difference between the UCI resource grants.

If the time difference between the resource elements of the UCI resource grants is less than the threshold (Y branch of block 1806), at block 1808, the scheduled entity may select at least one of the UCI resource grants based on one or more grant selection rules. In some examples, the scheduled entity may select both of the UCI resource grants without modifying either of the UCI resource grants. In other examples, the scheduled entity may select both of the UCI resource grants and either combine the set of resource elements allocated to each of the selected UCI resource grants into a single UCI resource grant over which the UCI may be multiplexed or combine the UCI for each of the UCI resource grants and separately transmit the combined UCI over each of the sets of resource elements of the UCI resource grants. In still other examples, the scheduled entity may select only one of the UCI resource grants and multiplex all or a portion of the UCI within the selected UCI resource grant. For example, the grant selection and configuration circuitry 1643 shown and described above in reference to FIG. 16 may select at least one of the UCI resource grants.

Figure 19:
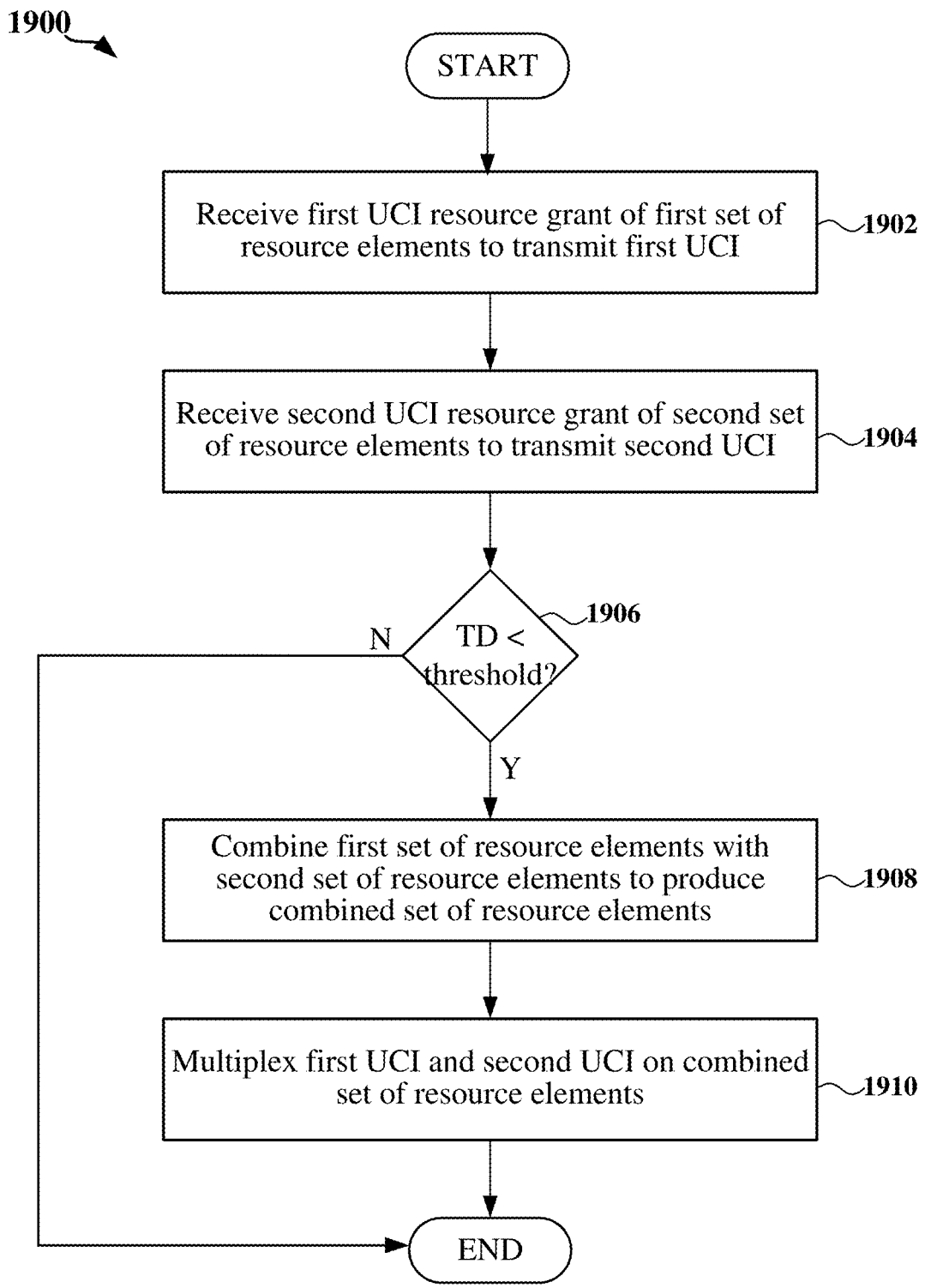
FIG. 19 is a flow chart illustrating another exemplary process for managing multiple uplink control information (UCI) resource grants to transmit UCI in a wireless communication network according to some aspects of the present disclosure.

FIG. 19 is a flow chart illustrating an exemplary process 1900 for managing multiple UCI resource grants to transmit uplink control information (UCI) in a wireless communication network according to some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduled entity illustrated in FIG. 16. In some examples, the process 1900 may be carried out by any suitable apparatus or means for carrying out the functions or algorithm described below.

At block 1902, the scheduled entity may receive a first UCI resource grant allocating a first set of resource elements for use by the scheduled entity to transmit first uplink control information (UCI). For example, the first UCI resource grant may be a dynamic UCI resource grant for aperiodic UCI received, for example, within a PDCCH. As another example, the first UCI resource grant may be a semi-static UCI resource grant for periodic UCI received, for example, within a PDCCH and configured via higher level (e.g., RRC) signaling. At block 1904, the scheduled entity may receive a second UCI resource grant allocating a second set of resource elements for use by the scheduled entity to transmit second UCI. For example, the second UCI resource grant may be a dynamic UCI resource grant for aperiodic UCI received, for example, within a PDCCH. As another example, the second UCI resource grant may be a semi-static UCI resource grant for periodic UCI received, for example, within a PDCCH and configured via higher level (e.g., RRC) signaling. For example, the DL traffic and control channel reception and processing circuitry 1642 shown and described above in reference to FIG. 16 may receive the first and second UCI resource grants.

At block 1906, the scheduled entity may determine whether a time difference (TD) between the first set of resource elements for the first UCI resource grant and the second set of resource elements for the second UCI resource grant is less than a threshold. The time difference may be determined from the start or end of the first UCI resource grant to the start or end of the second UCI resource grant. In addition, the threshold may include at least one transmission time interval, each corresponding to a set of two or more orthogonal frequency division multiplexed symbols, a mini-slot, a slot, or a set of two or more slots. In some examples, the threshold may include a single transmission time interval, two overlapping transmission time intervals, or two non-overlapping transmission time intervals. For example, the grant selection and configuration circuitry 1643 shown and described above in reference to FIG. 16 may determine the time difference between the UCI resource grants.

If the time difference between the resource elements of the UCI resource grants is less than the threshold (Y branch of block 1806), at block 1808, the scheduled entity may combine the first set of resource elements and the second set of resource elements to produce a combined set of resource elements. For example, the grant selection and configuration circuitry 1643 shown and described above in reference to FIG. 16 may combine the sets of resource elements from each of the UCI resource grants to produce the combined set of resource elements based on grant selection rules.

At block 1810, the scheduled entity may multiplex the first UCI and the second UCI on the combined set of resource elements. If the individual UCI resource grants are each PUCCH resource grants, the combined UCI resource grant may be treated as a PUCCH resource grant. However, if one or more of the individual UCI resource grants is a PUSCH resource grant, the combined UCI resource grant may be treated as a PUSCH resource grant. For example, the UL traffic and control channel generation and transmission circuitry 1641 shown and described above in reference to FIG. 16 may multiplex the UCI across the combined set of resource elements.

Figure 20:
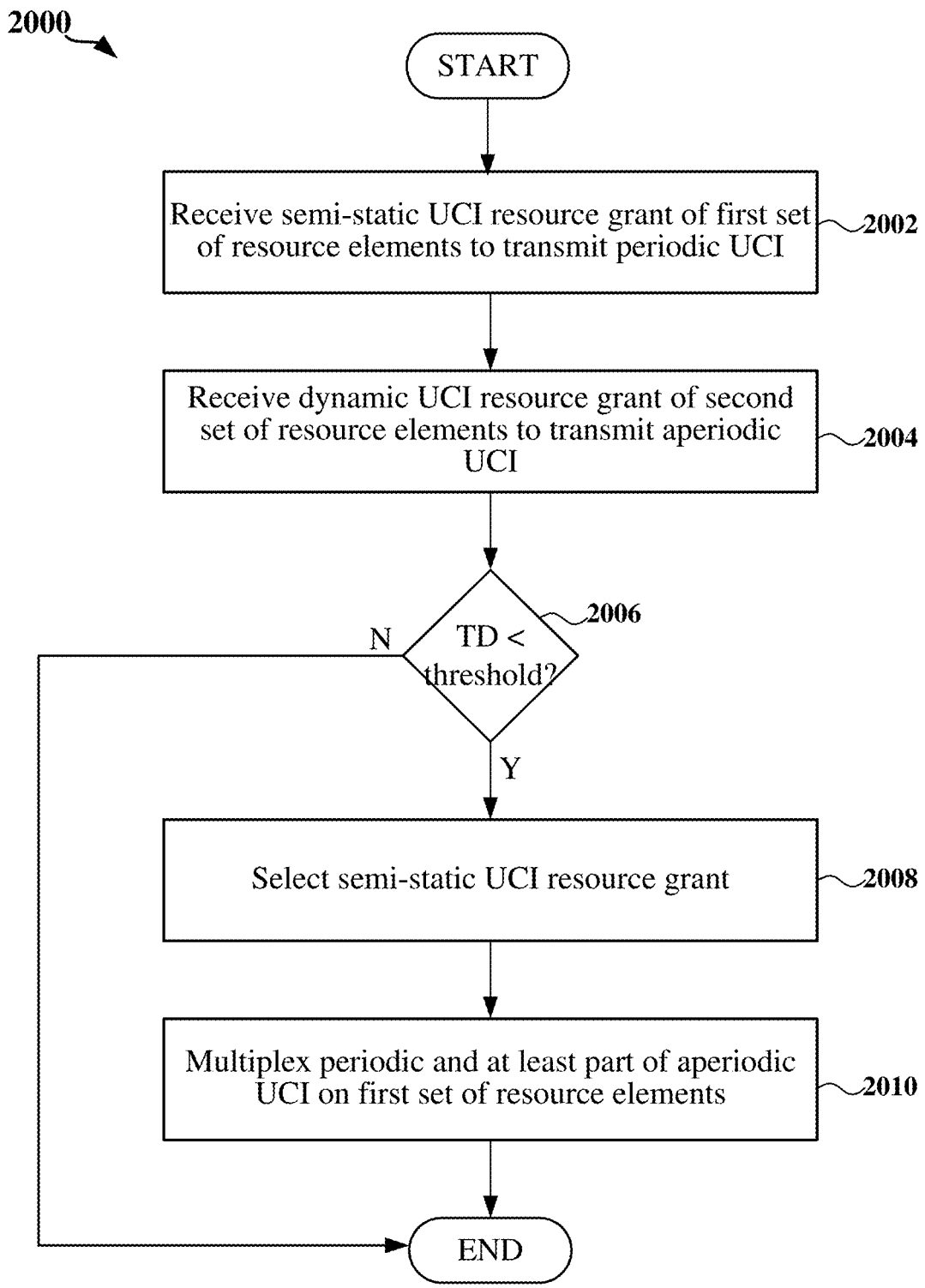
FIG. 20 is a flow chart illustrating another exemplary process for exemplary process for managing multiple uplink control information (UCI) resource grants to transmit UCI in a wireless communication network according to some aspects of the present disclosure

FIG. 20 is a flow chart illustrating an exemplary process 2000 for managing multiple UCI resource grants to transmit uplink control information (UCI) in a wireless communication network according to some aspects of the present disclosure. As described below, some or all illustrated features may be omitted in a particular implementation within the scope of the present disclosure, and some illustrated features may not be required for implementation of all embodiments. In some examples, the process 2000 may be carried out by the scheduled entity illustrated in FIG. 16. In some examples, the process 2000 may be carried out by any suitable apparatus or means for carrying out the functions or algorithm described below.

At block 2002, the scheduled entity may receive a semi-static UCI resource grant allocating a first set of resource elements for use by the scheduled entity to transmit periodic uplink control information (UCI). For example, the semi-static UCI resource grant may be received, for example, within a PDCCH and configured via higher level (e.g., RRC) signaling. At block 2004, the scheduled entity may receive a dynamic UCI resource grant allocating a second set of resource elements for use by the scheduled entity to transmit aperiodic UCI. For example, the dynamic UCI resource grant may be received, for example, within a PDCCH. For example, the DL traffic and control channel reception and processing circuitry 1642 shown and described above in reference to FIG. 16 may receive the semi-static and dynamic UCI resource grants.

At block 2006, the scheduled entity may determine whether a time difference (TD) between the first set of resource elements for the semi-static UCI resource grant and the second set of resource elements for the dynamic UCI resource grant is less than a threshold. The time difference may be determined from the start or end of the first UCI resource grant to the start or end of the second UCI resource grant. In addition, the threshold may include at least one transmission time interval, each corresponding to a set of two or more orthogonal frequency division multiplexed symbols, a mini-slot, a slot, or a set of two or more slots. In some examples, the threshold may include a single transmission time interval, two overlapping transmission time intervals, or two non-overlapping transmission time intervals. For example, the grant selection and configuration circuitry 1643 shown and described above in reference to FIG. 16 may determine the time difference between the UCI resource grants.

If the time difference between the resource elements of the UCI resource grants is less than the threshold (Y branch of block 2006), at block 2008, the scheduled entity may select the semi-static UCI resource grant. In some examples, the dynamic UCI resource grant includes a dynamic resource trigger identifying the aperiodic uplink control information that triggers selection of the periodic UCI resource grant. For example, the grant selection and configuration circuitry 1643 shown and described above in reference to FIG. 16 may select the semi-static UCI resource grant based on grant selection rules.

At block 2010, the scheduled entity may multiplex the periodic UCI and at least part of the aperiodic UCI on the first set of resource elements. In some examples, the dynamic resource trigger within the periodic UCI resource grant triggers the multiplexing of the periodic uplink control information and at least part of the aperiodic uplink control information on the first set of resource elements. For example, the UL traffic and control channel generation and transmission circuitry 1641 shown and described above in reference to FIG. 16 may multiplex the periodic and at least part of the aperiodic UCI on the first set of resource elements.

Figure 21:
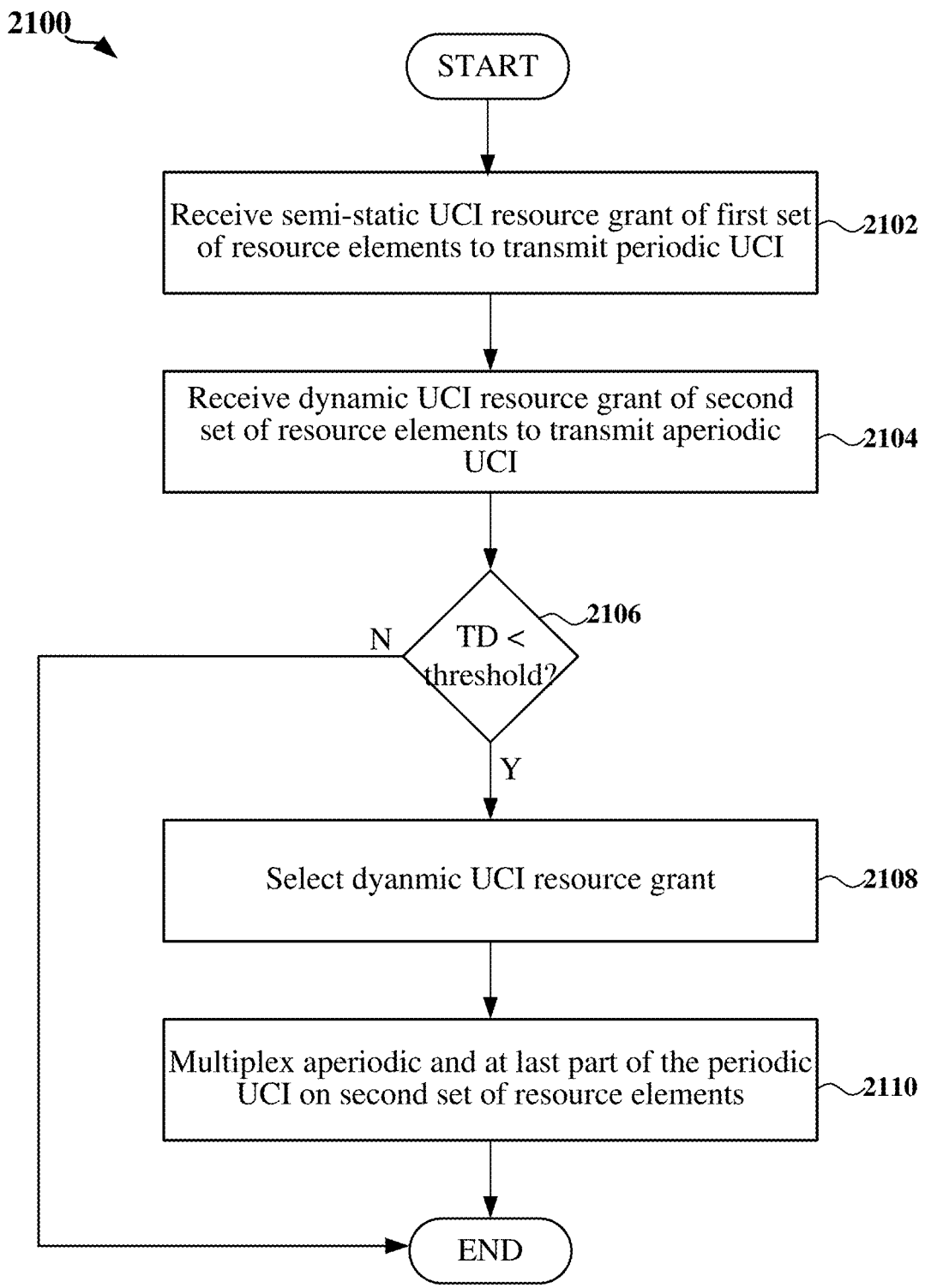
FIG. 21 is a flow chart illustrating another exemplary process for managing multiple uplink control information (UCI) resource grants to transmit UCI in a wireless communication network according to some aspects of the present disclosure.

FIG. 21 is a flow chart illustrating an exemplary process 2100 for managing multiple UCI resource grants to transmit uplink control information (UCI) in a wireless communication network according to some aspects of the present disclosure. As described below, some or all illustrated features may be omitted in a particular implementation within the scope of the present disclosure, and some illustrated features may not be required for implementation of all embodiments. In some examples, the process 2100 may be carried out by the scheduled entity illustrated in FIG. 16. In some examples, the process 2100 may be carried out by any suitable apparatus or means for carrying out the functions or algorithm described below.

At block 2102, the scheduled entity may receive a semi-static UCI resource grant allocating a first set of resource elements for use by the scheduled entity to transmit periodic uplink control information (UCI). For example, the semi-static UCI resource grant may be received, for example, within a PDCCH and configured via higher level (e.g., RRC) signaling. At block 2104, the scheduled entity may receive a dynamic UCI resource grant allocating a second set of resource elements for use by the scheduled entity to transmit aperiodic UCI. For example, the dynamic UCI resource grant may be received, for example, within a PDCCH. For example, the DL traffic and control channel reception and processing circuitry 1642 shown and described above in reference to FIG. 16 may receive the semi-static and dynamic UCI resource grants.

At block 2106, the scheduled entity may determine whether a time difference (TD) between the first set of resource elements for the semi-static UCI resource grant and the second set of resource elements for the dynamic UCI resource grant is less than a threshold. The time difference may be determined from the start or end of the first UCI resource grant to the start or end of the second UCI resource grant. In addition, the threshold may include at least one transmission time interval, each corresponding to a set of two or more orthogonal frequency division multiplexed symbols, a mini-slot, a slot, or a set of two or more slots. In some examples, the threshold may include a single transmission time interval, two overlapping transmission time intervals, or two non-overlapping transmission time intervals. For example, the grant selection and configuration circuitry 1643 shown and described above in reference to FIG. 16 may determine the time difference between the UCI resource grants.

If the time difference between the resource elements of the UCI resource grants is less than the threshold (Y branch of block 2106), at block 2108, the scheduled entity may select the dynamic UCI resource grant. For example, the grant selection and configuration circuitry 1643 shown and described above in reference to FIG. 16 may select the dynamic UCI resource grant based on grant selection rules.

At block 2110, the scheduled entity may multiplex the aperiodic UCI and at least part of the periodic UCI on the second set of resource elements. For example, the UL traffic and control channel generation and transmission circuitry 1641 shown and described above in reference to FIG. 16 may multiplex the aperiodic and at least part of the periodic UCI on the first set of resource elements.

Figure 22:
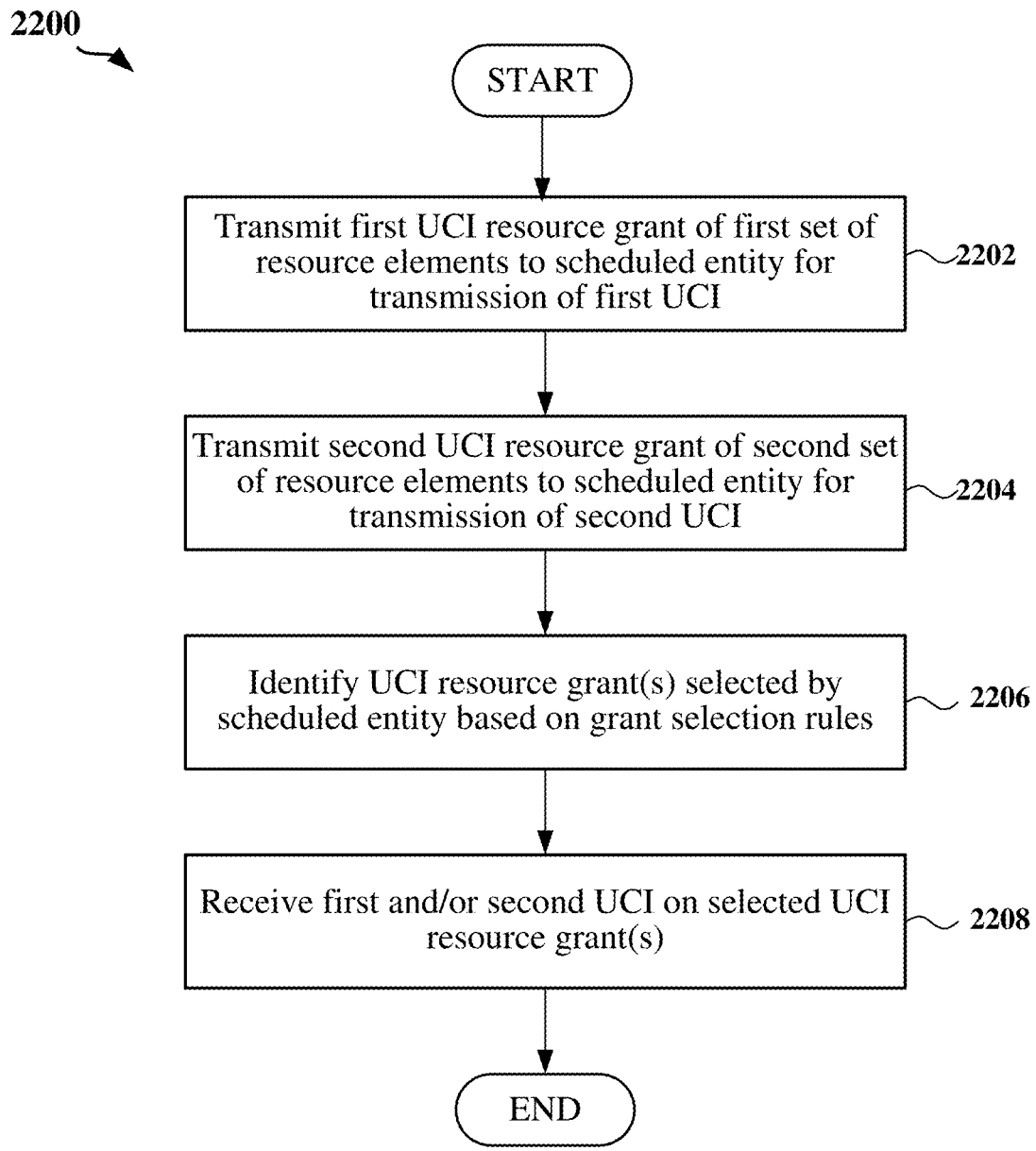
FIG. 22 is a flow chart illustrating an exemplary process for managing multiple uplink control information (UCI) resource grants to a scheduled entity to receive UCI in a wireless communication network according to some aspects of the present disclosure.

FIG. 22 is a flow chart illustrating an exemplary process 2200 for managing multiple UCI resource grants to a scheduled entity to receive uplink control information (UCI) in a wireless communication network according to some aspects of the present disclosure. As described below, some or all illustrated features may be omitted in a particular implementation within the scope of the present disclosure, and some illustrated features may not be required for implementation of all embodiments. In some examples, the process 2200 may be carried out by the scheduling entity illustrated in FIG. 15. In some examples, the process 2200 may be carried out by any suitable apparatus or means for carrying out the functions or algorithm described below.

At block 2202, the scheduling entity may transmit a first UCI resource grant allocating a first set of resource elements for use by the scheduled entity to transmit first uplink control information (UCI). For example, the first UCI resource grant may be a dynamic UCI resource grant for aperiodic UCI transmitted, for example, within a PDCCH. As another example, the first UCI resource grant may be a semi-static UCI resource grant for periodic UCI transmitted, for example, within a PDCCH and configured via higher level (e.g., RRC) signaling. At block 2204, the scheduling entity may transmit a second UCI resource grant allocating a second set of resource elements for use by the scheduled entity to transmit second UCI. For example, the second UCI resource grant may be a dynamic UCI resource grant for aperiodic UCI transmitted, for example, within a PDCCH. As another example, the second UCI resource grant may be a semi-static UCI resource grant for periodic UCI transmitted, for example, within a PDCCH and configured via higher level (e.g., RRC) signaling. For example, the resource assignment and scheduling circuitry 1541 and the DL traffic and control channel generation and transmission circuitry 1542 shown and described above in reference to FIG. 15 may generate and transmit the first and second UCI resource grants.

At block 2206, the scheduling entity may identify which of the first and/or second UCI resource grants will be selected by the scheduled entity based on grant selection rules maintained by the scheduling entity and the scheduled entity. In some examples, the scheduling entity may generate and transmit the grant selection rules to the scheduled entity. In other examples, the grant selection rules may be preconfigured and stored on the scheduling entity and the scheduled entity. In some examples, the scheduling entity may determine that the scheduled entity will select both of the UCI resource grants without modifying either of the UCI resource grants. In other examples, the scheduling entity may determine that the scheduled entity will select both of the UCI resource grants and either combine the set of resource elements allocated to each of the selected UCI resource grants into a single UCI resource grant over which the UCI may be multiplexed or combine the UCI for each of the UCI resource grants and separately transmit the combined UCI over each of the sets of resource elements of the UCI resource grants. In still other examples, the scheduling entity may determine that the scheduled entity will select only one of the UCI resource grants and multiplex all or a portion of the UCI within the selected UCI resource grant. For example, the UL traffic and control channel reception and processing circuitry 1543 shown and described above in reference to FIG. 15 may identify the selected UCI resource grants.

At block 2208, the scheduling entity may receive the first and/or second UCI on the selected UCI resource grant(s) from the scheduled entity. In some examples, the scheduling entity may maintain multiple decoding hypotheses for the UCI and apply one or more of the decoding hypotheses to decode the received UCI. For example, the UL traffic and control channel reception and processing circuitry 1543 shown and described above in reference to FIG. 15 may receive the UCI from the scheduled entity on the selected UCI resource grant(s).

In one configuration, a scheduled entity (e.g., a UE) in wireless communication with a scheduling entity in a wireless communication network includes means for receiving a first uplink control information (UCI) resource grant allocating a first set of resource elements for use by the scheduled entity to transmit first uplink control information to a scheduling entity, means for receiving a second UCI resource grant allocating a second set of resource elements for use by the scheduled entity to transmit second uplink control information to the scheduling entity, and when a time difference between the first set of resource elements and the second set of resource elements is less than a threshold indicating that the first UCI resource grant and the second UCI resource grant occur within a same time period, means for selecting at least one of the first UCI resource grant or the second UCI resource grant based on one or more grant selection rules, where the threshold corresponds to the time period.

In one aspect, the aforementioned means for receiving the first and second UCI resource grants and selecting at least one of the UCI resource grants may be the processor(s) 1604 shown in FIG. 16 configured to perform the functions recited by the aforementioned means. For example, the aforementioned means for receiving the first and second UCI resource grants may include the DL traffic and control channel generation and transmission circuitry 1641 shown in FIG. 16. As another example, the aforementioned means for selecting at least one of the UCI resource grants may include the grant selection and configuration circuitry 1643 shown in FIG. 16. In another aspect, the aforementioned means for communicating may be the transceiver 1610 and the processor(s) 1604 shown in FIG. 16 configured to perform the functions recited by the aforementioned means. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 15 and/or 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network, the method comprising:
    receiving, at a scheduled entity, a first uplink control information (UCI) resource grant allocating a first set of resource elements for use by the scheduled entity to transmit first uplink control information to a scheduling entity;
    receiving, at the scheduled entity, a second UCI resource grant allocating a second set of resource elements for use by the scheduled entity to transmit second uplink control information to the scheduling entity; and
    when a time difference between the first set of resource elements and the second set of resource elements is less than a threshold indicating that the first UCI resource grant and the second UCI resource grant occur within a same time period such that at least one of a start of the first UCI resource grant and a start of the second UCI resource grant are aligned in time or an end of the first UCI resource grant and an end of the second UCI resource grant are aligned in time, selecting at least one of the first UCI resource grant or the second UCI resource grant based on one or more grant selection rules.

2. The method of claim 1, wherein the threshold comprises at least one transmission time interval, each of the at least one transmission time interval corresponding to a set of one or more orthogonal frequency division multiplexed (OFDM) symbols, a mini-slot, a slot, or a set of two or more slots.

3. The method of claim 2, wherein the at least one transmission time interval comprises a single transmission time interval, two overlapping transmission time intervals, or two non-overlapping transmission time intervals.

4. The method of claim 3, wherein the at least one transmission time interval comprises the two non-overlapping transmission time intervals and the threshold is equal to a maximum time period between a start or an end of a first transmission time interval of the two non-overlapping transmission time intervals and a start or an end of a second transmission time interval of the two non-overlapping transmission time intervals.

5. The method of claim 2, wherein:
the time difference is between the start of the first UCI resource grant and the start of the second UCI resource grant;
the threshold is equal to a single OFDM symbol; and
selecting at least one of the first UCI resource grant or the second UCI resource grant based on the one or more grant selection rules further comprises:
selecting at least one of the first UCI resource grant or the second UCI resource grant based on the one or more grant selection rules when the time difference is less than the single OFDM symbol such that the start of the first UCI resource grant and the start of the second UCI resource grant are aligned in time.

6. The method of claim 2, wherein:
the time difference is between the end of the first UCI resource grant and the end of the second UCI resource grant;
the threshold is equal to a single OFDM symbol; and
selecting at least one of the first UCI resource grant or the second UCI resource grant based on the one or more grant selection rules further comprises:
selecting at least one of the first UCI resource grant or the second UCI resource grant based on the one or more grant selection rules when the time difference is less than the single OFDM symbol such that the end of the first UCI resource grant and the end of the second UCI resource grant are aligned in time.

7. The method of claim 2, wherein:
the time difference comprises a first time difference between the start of the first UCI resource grant and the start of the second UCI resource grant and a second time difference between the end of the first UCI resource grant and the end of the second UCI resource grant;
the threshold is equal to a single OFDM symbol; and
selecting at least one of the first UCI resource grant or the second UCI resource grant based on the one or more grant selection rules further comprises:
selecting at least one of the first UCI resource grant or the second UCI resource grant based on the one or more grant selection rules when the first time difference is less than the single OFDM symbol and the second time difference is less than the single OFDM symbol such that the first UCI resource grant and the second UCI resource grant are completely aligned in time.

8. The method of claim 1, wherein selecting at least one of the first UCI resource grant or the second UCI resource grant further comprises:
combining the first set of resource elements for the first UCI resource grant with the second set of resource elements for the second UCI resource grant to produce a combined set of resource elements; and
multiplexing the first uplink control information and the second uplink control information on the combined set of resource elements.

9. The method of claim 8, wherein the combined set of resource elements comprises a physical uplink control channel (PUCCH) resource when the first UCI resource grant comprises a first PUCCH grant and the second UCI resource grant comprises a second PUCCH grant.

10. The method of claim 8, wherein the combined set of resource elements comprises a physical uplink shared channel (PUSCH) grant when at least one of the first UCI resource grant or the second UCI resource grant comprises a PUSCH grant.

11. The method of claim 1, wherein the first UCI resource grant comprises a semi-static UCI resource grant, the first uplink control information comprises periodic uplink control information, the second UCI resource grant comprises a dynamic UCI resource grant, and the second uplink control information comprises aperiodic uplink control information.

12. The method of claim 11, wherein selecting at least one of the first UCI resource grant or the second UCI resource grant further comprises:
selecting the semi-static UCI resource grant; and
multiplexing the periodic uplink control information and at least part of the aperiodic uplink control information on the first set of resource elements.

13. The method of claim 12, wherein:
the dynamic UCI resource grant comprises a dynamic resource trigger identifying the aperiodic uplink control information; and
the multiplexing the periodic uplink control information and at least part of the aperiodic uplink control information on the first set of resource elements is triggered by the dynamic resource trigger.

14. The method of claim 11, wherein selecting at least one of the first UCI resource grant or the second UCI resource grant further comprises:
selecting the dynamic UCI resource grant; and
multiplexing the aperiodic uplink control information and at least part of the periodic uplink control information on the second set of resource elements.

15. The method of claim 11, wherein selecting at least one of the first UCI resource grant or the second UCI resource grant further comprises:
selecting one of the semi-static UCI resource grant or the dynamic UCI resource grant that occurs earlier in time or comprises a larger set of resources.

16. The method of claim 1, wherein selecting at least one of the first UCI resource grant or the second UCI resource grant further comprises:
selecting both the first UCI resource grant and the second UCI resource grant;
transmitting the first uplink control information and the second uplink control information on the first set of resource elements; and
transmitting the first uplink control information and the second uplink control information on the second set of resource elements.

17. The method of claim 1, wherein the one or more grant selection rules are based on at least one of a payload type of at least one of the first uplink control information or the second uplink control information, a payload size of at least one of the first uplink control information or the second uplink control information, a waveform type of at least one of the first UCI resource grant or the second UCI resource grant, a transmit-diversity scheme of at least one of the first UCI resource grant or the second UCI resource grant, time resources utilized by at least one of the first set of resource elements or the second set of resource elements, or frequency resources utilized by at least one of the first set of resource elements or the second set of resource elements.

18. A scheduled entity, comprising:
a processor;
a transceiver coupled to the processor; and
a memory coupled to the processor, wherein the processor is configured to:
receive a first uplink control information (UCI) resource grant allocating a first set of resource elements for use by the scheduled entity to transmit first uplink control information to a scheduling entity via the transceiver;
receive a second UCI resource grant allocating a second set of resource elements for use by the scheduled entity to transmit second uplink control information to the scheduling entity via the transceiver; and
when a time difference between the first set of resource elements and the second set of resource elements is less than a threshold indicating that the first UCI resource grant and the second UCI resource grant occur within a same time period such that at least one of a start of the first UCI resource grant and a start of the second UCI resource grant are aligned in time or an end of the first UCI resource grant and an end of the second UCI resource grant are aligned in time, select at least one of the first UCI resource grant or the second UCI resource grant based on one or more grant selection rules.

19. The scheduled entity of claim 18, wherein the threshold comprises at least one transmission time interval, each of the at least one transmission time interval corresponding to a set of one or more orthogonal frequency division multiplexed (OFDM) symbols, a mini-slot, a slot, or a set of two or more slots.

20. The scheduled entity of claim 19, wherein the at least one transmission time interval comprises a single transmission time interval, two overlapping transmission time intervals, or two non-overlapping transmission time intervals.

21. The scheduled entity of claim 20, wherein the at least one transmission time interval comprises the two non-overlapping transmission time intervals and the threshold is equal to a maximum time period between a start or an end of a first transmission time interval of the two non-overlapping transmission time intervals and a start or an end of a second transmission time interval of the two non-overlapping transmission time intervals.

22. The scheduled entity of claim 19, wherein:
the time difference is between the start of the first UCI resource grant and the start of the second UCI resource grant;
the threshold is equal to a single OFDM symbol; and
the processor is further configured to:
select at least one of the first UCI resource grant or the second UCI resource grant based on the one or more grant selection rules when the time difference is less than the single OFDM symbol such that the start of the first UCI resource grant and the start of the second UCI resource grant are aligned in time.

23. The scheduled entity of claim 19, wherein:
the time difference is between the end of the first UCI resource grant and the end of the second UCI resource grant;
the threshold is equal to a single OFDM symbol; and
the processor is further configured to:
select at least one of the first UCI resource grant or the second UCI resource grant based on the one or more grant selection rules when the time difference is less than the single OFDM symbol such that the end of the first UCI resource grant and the end of the second UCI resource grant are aligned in time.

24. The scheduled entity of claim 19, wherein:
the time difference comprises a first time difference between the start of the first UCI resource grant and the start of the second UCI resource grant and a second time difference between the end of the first UCI resource grant and the end of the second UCI resource grant;
the threshold is equal to a single OFDM symbol; and
the processor is further configured to:
select at least one of the first UCI resource grant or the second UCI resource grant based on the one or more grant selection rules when the first time difference is less than the single OFDM symbol and the second time difference is less than the single OFDM symbol such that the first UCI resource grant and the second UCI resource grant are completely aligned in time.

25. The scheduled entity of claim 18, wherein the processor is further configured to:
combine the first set of resource elements for the first UCI resource grant with the second set of resource elements for the second UCI resource grant to produce a combined set of resource elements; and
multiplex the first uplink control information and the second uplink control information on the combined set of resource elements.

26. The scheduled entity of claim 25, wherein the combined set of resource elements comprises a physical uplink control channel (PUCCH) resource when the first UCI resource grant comprises a first PUCCH grant and the second UCI resource grant comprises a second PUCCH grant.

27. The scheduled entity of claim 25, wherein the combined set of resource elements comprises a physical uplink shared channel (PUSCH) grant when at least one of the first UCI resource grant or the second UCI resource grant comprises a PUSCH grant.

28. The scheduled entity of claim 18, wherein the first UCI resource grant comprises a semi-static UCI resource grant, the first uplink control information comprises periodic uplink control information, the second UCI resource grant comprises a dynamic UCI resource grant, and the second uplink control information comprises aperiodic uplink control information.

29. The scheduled entity of claim 28, wherein the processor is further configured to:
select the semi-static UCI resource grant; and
multiplex the periodic uplink control information and at least part of the aperiodic uplink control information on the first set of resource elements.

30. The scheduled entity of claim 29, wherein:
the dynamic UCI resource grant comprises a dynamic resource trigger identifying the aperiodic uplink control information; and
the multiplexing the periodic uplink control information and at least part of the aperiodic uplink control information on the first set of resource elements is triggered by the dynamic resource trigger.

31. The scheduled entity of claim 28, wherein the processor is further configured to:
select the dynamic UCI resource grant; and multiplex the aperiodic uplink control information and at least part of the periodic uplink control information on the second set of resource elements.

32. The scheduled entity of claim 28, wherein the processor is further configured to:
select one of the semi-static UCI resource grant or the dynamic UCI resource grant that occurs earlier in time or comprises a larger set of resources.

33. The scheduled entity of claim 18, wherein the processor is further configured to:
select both the first UCI resource grant and the second UCI resource grant;
transmit the first uplink control information and the second uplink control information on the first set of resource elements; and
transmit the first uplink control information and the second uplink control information on the second set of resource elements.

34. The scheduled entity of claim 18, wherein the one or more grant selection rules are based on at least one of a payload type of at least one of the first uplink control information or the second uplink control information, a payload size of at least one of the first uplink control information or the second uplink control information, a waveform type of at least one of the first UCI resource grant or the second UCI resource grant, a transmit-diversity scheme of at least one of the first UCI resource grant or the second UCI resource grant, time resources utilized by at least one of the first set of resource elements or the second set of resource elements, or frequency resources utilized by at least one of the first set of resource elements or the second set of resource elements.

35. A scheduled entity, comprising:
means for receiving a first uplink control information (UCI) resource grant allocating a first set of resource elements for use by the scheduled entity to transmit first uplink control information to a scheduling entity;
means for receiving a second UCI resource grant allocating a second set of resource elements for use by the scheduled entity to transmit second uplink control information to the scheduling entity; and
when a time difference between the first set of resource elements and the second set of resource elements is less than a threshold indicating that the first UCI resource grant and the second UCI resource grant occur within a same time period such that at least one of a start of the first UCI resource grant and a start of the second UCI resource grant are aligned in time or an end of the first UCI resource grant and an end of the second UCI resource grant are aligned in time, means for selecting at least one of the first UCI resource grant or the second UCI resource grant based on one or more grant selection rules.

36. The scheduled entity of claim 35, wherein the threshold comprises at least one transmission time interval, each of the at least one transmission time interval corresponding to a set of one or more orthogonal frequency division multiplexed (OFDM) symbols, a mini-slot, a slot, or a set of two or more slots.

37. The scheduled entity of claim 36, wherein the at least one transmission time interval comprises a single transmission time interval, two overlapping transmission time intervals, or two non-overlapping transmission time intervals.

38. The scheduled entity of claim 37, wherein the at least one transmission time interval comprises the two non-overlapping transmission time intervals and the threshold is equal to a maximum time period between a start or an end of a first transmission time interval of the two non-overlapping transmission time intervals and a start or an end of a second transmission time interval of the two non-overlapping transmission time intervals.

39. The scheduled entity of claim 36, wherein:
the time difference is between the start of the first UCI resource grant and the start of the second UCI resource grant;
the threshold is equal to a single OFDM symbol; and
the means for selecting at least one of the first UCI resource grant or the second UCI resource grant based on the one or more grant selection rules further comprises:
means for selecting at least one of the first UCI resource grant or the second UCI resource grant based on the one or more grant selection rules when the time difference is less than the single OFDM symbol such that the start of the first UCI resource grant and the start of the second UCI resource grant are aligned in time.

40. The scheduled entity of claim 36, wherein:
the time difference is between the end of the first UCI resource grant and the end of the second UCI resource grant;
the threshold is equal to a single OFDM symbol; and
the means for selecting at least one of the first UCI resource grant or the second UCI resource grant based on the one or more grant selection rules further comprises:
means for selecting at least one of the first UCI resource grant or the second UCI resource grant based on the one or more grant selection rules when the time difference is less than the single OFDM symbol such that the end of the first UCI resource grant and the end of the second UCI resource grant are aligned in time.

41. The scheduled entity of claim 36, wherein:
the time difference comprises a first time difference between the start of the first UCI resource grant and the start of the second UCI resource grant and a second time difference between the end of the first UCI resource grant and the end of the second UCI resource grant;
the threshold corresponding to the time period is equal to a single OFDM symbol; and
the means for selecting at least one of the first UCI resource grant or the second UCI resource grant based on the one or more grant selection rules further comprises:
means for selecting at least one of the first UCI resource grant or the second UCI resource grant based on the one or more grant selection rules when the first time difference is less than the single OFDM symbol and the second time difference is less than the single OFDM symbol such that the first UCI resource grant and the end of the second UCI resource grant are completely aligned in time.

42. The scheduled entity of claim 35, wherein the means for selecting at least one of the first UCI resource grant or the second UCI resource grant further comprises:
means for combining the first set of resource elements for the first UCI resource grant with the second set of resource elements for the second UCI resource grant to produce a combined set of resource elements; and
means for multiplexing the first uplink control information and the second uplink control information on the combined set of resource elements.

43. The scheduled entity of claim 42, wherein the combined set of resource elements comprises a physical uplink control channel (PUCCH) resource when the first UCI resource grant comprises a first PUCCH grant and the second UCI resource grant comprises a second PUCCH grant.

44. The scheduled entity of claim 42, wherein the combined set of resource elements comprises a physical uplink shared channel (PUSCH) grant when at least one of the first UCI resource grant or the second UCI resource grant comprises a PUSCH grant.

45. The scheduled entity of claim 35, wherein the first UCI resource grant comprises a semi-static UCI resource grant, the first uplink control information comprises periodic uplink control information, the second UCI resource grant comprises a dynamic UCI resource grant, and the second uplink control information comprises aperiodic uplink control information.

46. The scheduled entity of claim 45, wherein the means for selecting at least one of the first UCI resource grant or the second UCI resource grant further comprises:
  means for selecting the semi-static UCI resource grant; and
  means for multiplexing the periodic uplink control information and at least part of the aperiodic uplink control information on the first set of resource elements.

47. The scheduled entity of claim 46, wherein:
  the dynamic UCI resource grant comprises a dynamic resource trigger identifying the aperiodic uplink control information; and
  the means for multiplexing the periodic uplink control information and at least part of the aperiodic uplink control information on the first set of resource elements is triggered by the dynamic resource trigger.

48. The scheduled entity of claim 45, wherein the means for selecting at least one of the first UCI resource grant or the second UCI resource grant further comprises:
  means for selecting the dynamic UCI resource grant; and
  means for multiplexing the aperiodic uplink control information and at least part of the periodic uplink control information on the second set of resource elements.

49. The scheduled entity of claim 45, wherein the means for selecting at least one of the first UCI resource grant or the second UCI resource grant further comprises:
  means for selecting one of the semi-static UCI resource grant or the dynamic UCI resource grant that occurs earlier in time or comprises a larger set of resources.

50. The scheduled entity of claim 35, wherein the means for selecting at least one of the first UCI resource grant or the second UCI resource grant further comprises:
  means for selecting both the first UCI resource grant and the second UCI resource grant;
  means for transmitting the first uplink control information and the second uplink control information on the first set of resource elements; and
  means for transmitting the first uplink control information and the second uplink control information on the second set of resource elements.

51. The scheduled entity of claim 35, wherein the one or more grant selection rules are based on at least one of a payload type of at least one of the first uplink control information or the second uplink control information, a payload size of at least one of the first uplink control information or the second uplink control information, a waveform type of at least one of the first UCI resource grant or the second UCI resource grant, a transmit-diversity scheme of at least one of the first UCI resource grant or the second UCI resource grant, time resources utilized by at least one of the first set of resource elements or the second set of resource elements, or frequency resources utilized by at least one of the first set of resource elements or the second set of resource elements.

52. A non-transitory computer-readable medium storing computer executable code, comprising code for causing a scheduled entity to:
  receive a first uplink control information (UCI) resource grant allocating a first set of resource elements for use by the scheduled entity to transmit first uplink control information to a scheduling entity;
  receive a second UCI resource grant allocating a second set of resource elements for use by the scheduled entity to transmit second uplink control information to the scheduling entity; and
  when a time difference between the first set of resource elements and the second set of resource elements is less than a threshold indicating that the first UCI resource grant and the second UCI resource grant occur within a same time period such that at least one of a start of the first UCI resource grant and a start of the second UCI resource grant are aligned in time or an end of the first UCI resource grant and an end of the second UCI resource grant are aligned in time, select at least one of the first UCI resource grant or the second UCI resource grant based on one or more grant selection rules.

53. The non-transitory computer-readable medium of claim 52, wherein the threshold comprises at least one transmission time interval, each of the at least one transmission time interval corresponding to a set of one or more orthogonal frequency division multiplexed (OFDM) symbols, a mini-slot, a slot, or a set of two or more slots.

54. The non-transitory computer-readable medium of claim 53, wherein the at least one transmission time interval comprises a single transmission time interval, two overlapping transmission time intervals, or two non-overlapping transmission time intervals.

55. The non-transitory computer-readable medium of claim 54, wherein the at least one transmission time interval comprises the two non-overlapping transmission time intervals and the threshold is equal to a maximum time period between a start or an end of a first transmission time interval of the two non-overlapping transmission time intervals and a start or an end of a second transmission time interval of the two non-overlapping transmission time intervals.

56. The non-transitory computer-readable medium of claim 53, wherein:
  the time difference is between the start of the first UCI resource grant and the start of the second UCI resource grant; and
  the threshold is equal to a single OFDM symbol; and
  further comprising code for causing the scheduled entity to:
    select at least one of the first UCI resource grant or the second UCI resource grant based on the one or more grant selection rules when the time difference is less than the single OFDM symbol such that the start of the first UCI resource grant and the start of the second UCI resource grant are aligned in time.

57. The non-transitory computer-readable medium of claim 53, wherein:
  the time difference is between the end of the first UCI resource grant and the end of the second UCI resource grant; and the threshold is equal to a single OFDM symbol; and further comprising code for causing the scheduled entity to:
select at least one of the first UCI resource grant or the second UCI resource grant based on the one or more grant selection rules when the time difference is less than the single OFDM symbol such that the end of the first UCI resource grant and the end of the second UCI resource grant are aligned in time.

58. The non-transitory computer-readable medium of claim 53, wherein:
the time difference comprises a first time difference between the start of the first UCI resource grant and the start of the second UCI resource grant and a second time difference between the end of the first UCI resource grant and the end of the second UCI resource grant; and
the threshold corresponding to the time period is equal to a single OFDM symbol; and further comprising code for causing the scheduled entity to:
select at least one of the first UCI resource grant or the second UCI resource grant based on the one or more grant selection rules when the first time difference is less than the single OFDM symbol and the second time difference is less than the single OFDM symbol such that the first UCI resource grant and the end of the second UCI resource grant are completely aligned in time.

59. The non-transitory computer-readable medium of claim 52, further comprising code for causing the scheduled entity to:
combine the first set of resource elements for the first UCI resource grant with the second set of resource elements for the second UCI resource grant to produce a combined set of resource elements; and
multiplex the first uplink control information and the second uplink control information on the combined set of resource elements.

60. The non-transitory computer-readable medium of claim 59, wherein the combined set of resource elements comprises a physical uplink control channel (PUCCH) resource when the first UCI resource grant comprises a first PUCCH grant and the second UCI resource grant comprises a second PUCCH grant.

61. The non-transitory computer-readable medium of claim 59, wherein the combined set of resource elements comprises a physical uplink shared channel (PUSCH) grant when at least one of the first UCI resource grant or the second UCI resource grant comprises a PUSCH grant.

62. The non-transitory computer-readable medium of claim 52, wherein the first UCI resource grant comprises a semi-static UCI resource grant, the first uplink control information comprises periodic uplink control information, the second UCI resource grant comprises a dynamic UCI resource grant, and the second uplink control information comprises aperiodic uplink control information.

63. The non-transitory computer-readable medium of claim 62, further comprising code for causing the scheduled entity to:
select the semi-static UCI resource grant; and
multiplex the periodic uplink control information and at least part of the aperiodic uplink control information on the first set of resource elements.

64. The non-transitory computer-readable medium of claim 63, wherein:
the dynamic UCI resource grant comprises a dynamic resource trigger identifying the aperiodic uplink control information; and
the multiplexing the periodic uplink control information and at least part of the aperiodic uplink control information on the first set of resource elements is triggered by the dynamic resource trigger.

65. The non-transitory computer-readable medium of claim 62, further comprising code for causing the scheduled entity to:
select the dynamic UCI resource grant; and
multiplex the aperiodic uplink control information and at least part of the periodic uplink control information on the second set of resource elements.

66. The non-transitory computer-readable medium of claim 62, further comprising code for causing the scheduled entity to:
select one of the semi-static UCI resource grant or the dynamic UCI resource grant that occurs earlier in time or comprises a larger set of resources.

67. The non-transitory computer-readable medium of claim 52, further comprising code for causing the scheduled entity to:
select both the first UCI resource grant and the second UCI resource grant;
transmit the first uplink control information and the second uplink control information on the first set of resource elements; and
transmit the first uplink control information and the second uplink control information on the second set of resource elements.

68. The non-transitory computer-readable medium of claim 52, wherein the one or more grant selection rules are based on at least one of a payload type of at least one of the first uplink control information or the second uplink control information, a payload size of at least one of the first uplink control information or the second uplink control information, a waveform type of at least one of the first UCI resource grant or the second UCI resource grant, a transmit-diversity scheme of at least one of the first UCI resource grant or the second UCI resource grant, time resources utilized by at least one of the first set of resource elements or the second set of resource elements, or frequency resources utilized by at least one of the first set of resource elements or the second set of resource elements.

* * * * *